United States Patent
Rajarathnam et al.

(10) Patent No.: US 11,380,022 B2
(45) Date of Patent: Jul. 5, 2022

(54) CONTENT MODIFICATION IN A SHARED SESSION AMONG MULTIPLE HEAD-MOUNTED DISPLAY DEVICES

(71) Applicant: SONY GROUP CORPORATION, Tokyo (JP)

(72) Inventors: Sandeep Rajarathnam, Bangalore (IN); Prashanth Puttamalla, Bangalore (IN)

(73) Assignee: SONY GROUP CORPORATION, Tokyo (JP)

( * ) Notice: Subject to any disclaimer, the term of this patent is extended or adjusted under 35 U.S.C. 154(b) by 70 days.

(21) Appl. No.: 17/077,595

(22) Filed: Oct. 22, 2020

(65) Prior Publication Data

US 2022/0130077 A1 Apr. 28, 2022

(51) Int. Cl.
| | |
|---|---|
| *G06F 3/00* | (2006.01) |
| *G06T 11/00* | (2006.01) |
| *G06F 3/0482* | (2013.01) |
| *G06T 5/00* | (2006.01) |
| *G10L 25/51* | (2013.01) |
| *G06V 10/25* | (2022.01) |
| *G06V 40/18* | (2022.01) |

(52) U.S. Cl.
CPC ............ *G06T 11/00* (2013.01); *G06F 3/0482* (2013.01); *G06T 5/002* (2013.01); *G06V 10/25* (2022.01); *G06V 40/18* (2022.01); *G10L 25/51* (2013.01); *G06T 2200/24* (2013.01); *G06T 2210/36* (2013.01)

(58) Field of Classification Search
None
See application file for complete search history.

(56) References Cited

U.S. PATENT DOCUMENTS

| | | | |
|---|---|---|---|
| 9,818,225 B2 | 11/2017 | Mao et al. | |
| 2015/0253573 A1* | 9/2015 | Sako | H04N 13/398 345/207 |
| 2017/0337476 A1* | 11/2017 | Gordon | H04N 21/44231 |
| 2017/0339338 A1* | 11/2017 | Gordon | G06V 40/174 |

(Continued)

FOREIGN PATENT DOCUMENTS

| KR | 10-2018-0017736 A | 2/2018 |
|---|---|---|
| KR | 10-2049045 B1 | 11/2019 |

*Primary Examiner* — Martin Mushambo
(74) *Attorney, Agent, or Firm* — Chip Law Group

(57) ABSTRACT

An electronic device and method are provided for content modification in a shared session among multiple head-mounted display (HMD) devices. The electronic device determines emotional state information associated with a wearer of each of a plurality of HMD devices. Each HMD device renders media content in a computer-simulated environment and the emotional state information corresponds to a first portion of the rendered media content. The electronic device constructs an input feature for a first neural network based on the first portion of the rendered media content and the emotional state information. The electronic device selects, from a set of content modification operations, a first content modification operation based on an application of the first neural network on the input feature. Thereafter, the electronic device modifies the rendered media content based on the selected first content modification operation. The modified media content is rendered on at least one HMD device.

20 Claims, 15 Drawing Sheets

(56) References Cited

U.S. PATENT DOCUMENTS

2017/0365101 A1* 12/2017 Samec .................. G16H 50/20
2018/0092547 A1*  4/2018 Tzvieli ................. G06V 10/751
2018/0103913 A1*  4/2018 Tzvieli ................. G06V 10/462
2019/0180509 A1   6/2019 Laaksonen et al.
2019/0275419 A1*  9/2019 Sun ..................... G06V 40/168

* cited by examiner

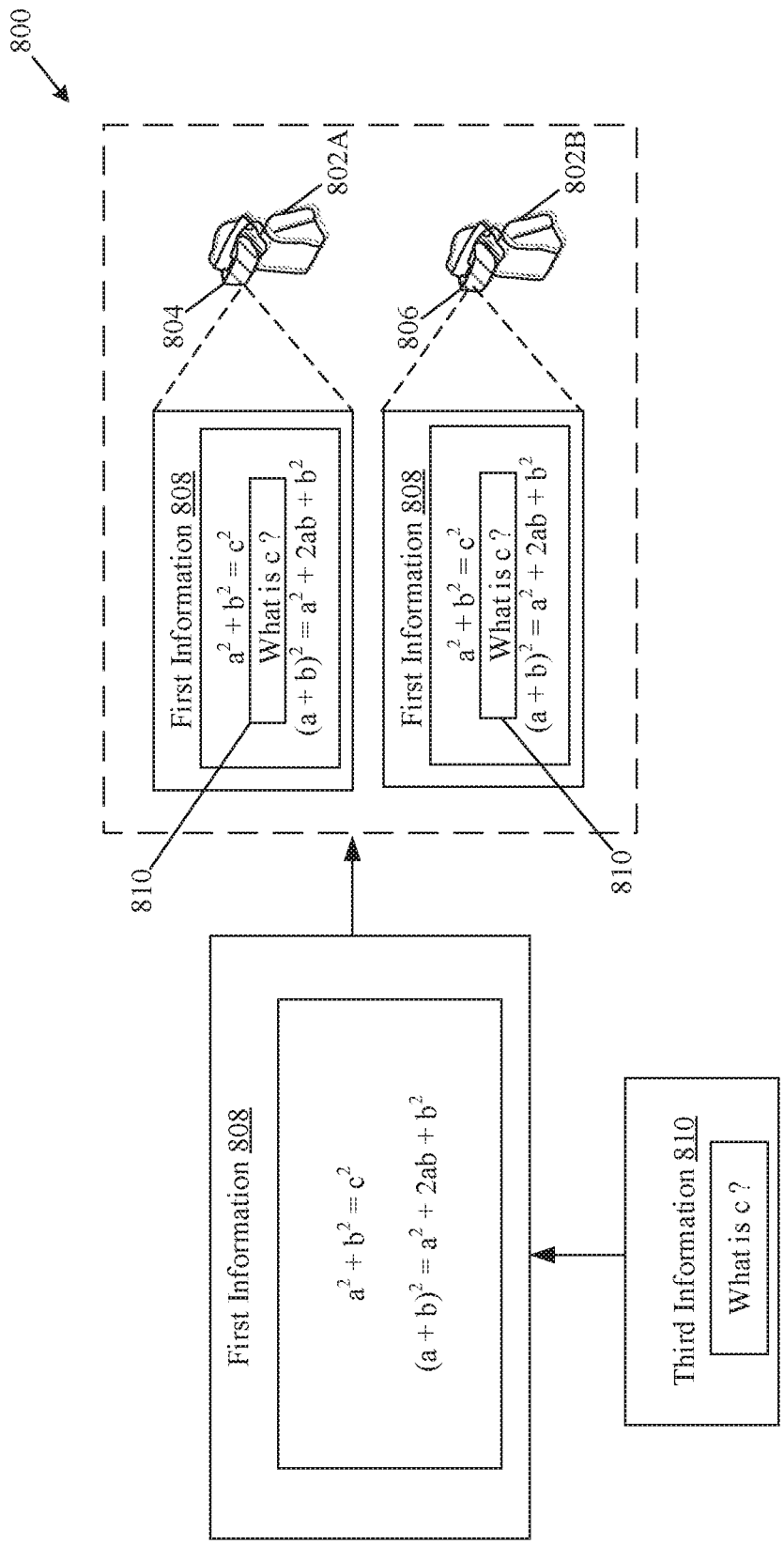

US 11,380,022 B2

CONTENT MODIFICATION IN A SHARED SESSION AMONG MULTIPLE HEAD-MOUNTED DISPLAY DEVICES

CROSS-REFERENCE TO RELATED APPLICATIONS/INCORPORATION BY REFERENCE

None.

FIELD

Various embodiments of the disclosure relate to virtual reality technology. More specifically, various embodiments of the disclosure relate to an electronic device and method for content modification in a shared session among multiple head-mounted display (HMD) devices.

BACKGROUND

Advancements in extended reality (XR) technology have enabled display devices, such as XR headsets to join or create a session where common media content may be rendered on such devices. In a shared session, two or more users of display devices may not have the same viewing or immersion experience at all times within the duration of the session. This may cause some of the users to lose interest in the content or drop out of the shared session.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for content modification in a shared session among multiple head-mounted display (HMD) devices is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 8 is a diagram that illustrates exemplary scenario for inclusion of additional information in a first portion of rendered media content, in accordance with an embodiment of the disclosure.

DETAILED DESCRIPTION

Figure 1:
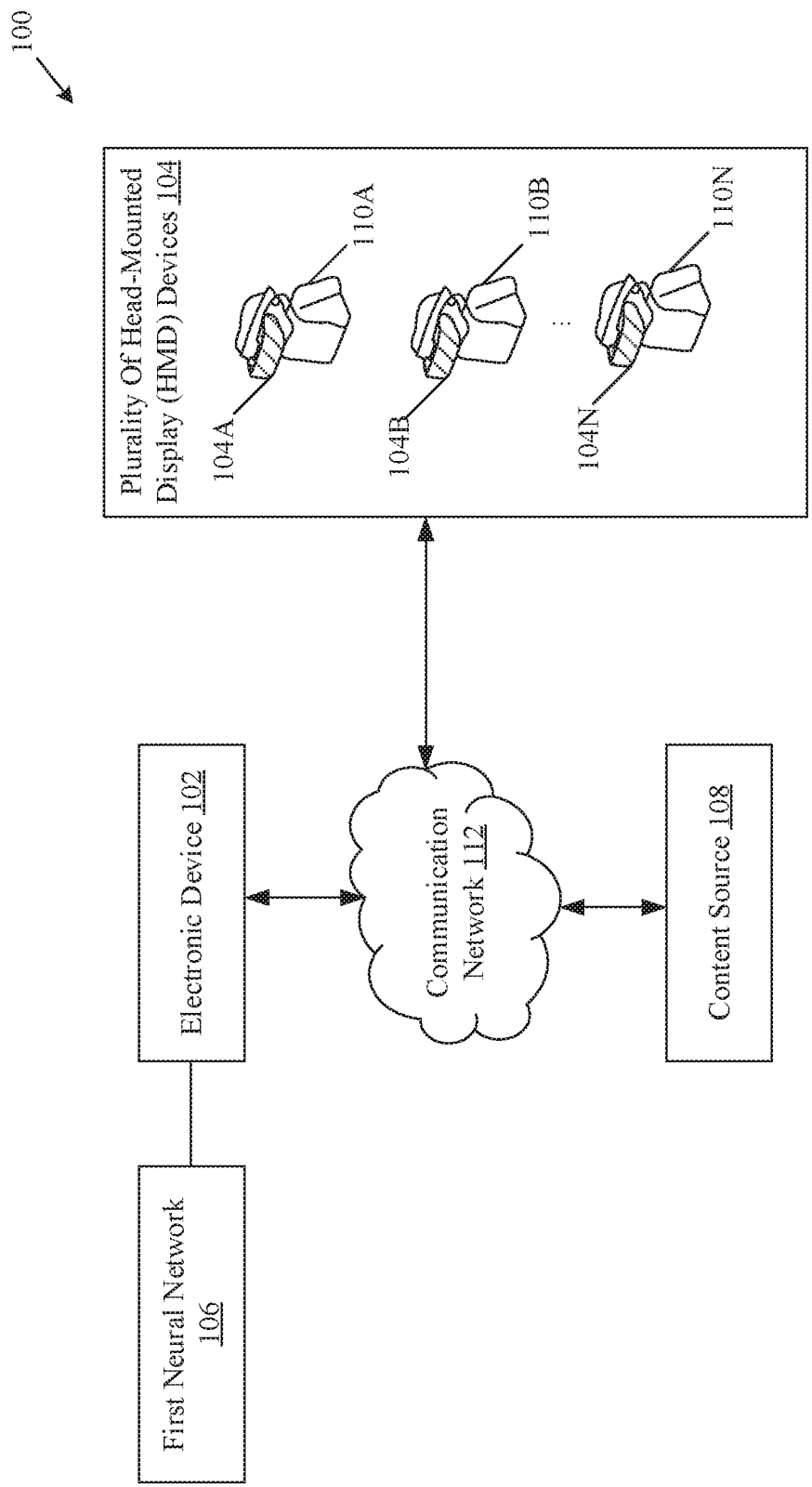
FIG. 1 is a block diagram that illustrates an exemplary network environment for content modification in a shared session among multiple head-mounted display (HMD) devices, in accordance with an embodiment of the disclosure.

The following described implementations may be found in the disclosed electronic device and method for content modification in a shared session among multiple head-mounted display (HMD) devices. Exemplary aspects of the disclosure provide an electronic device, which may modify media content (such as image content or video content) in a shared extended reality (XR) session among multiple viewers, based on emotional state information associated with each of the multiple viewers. The media content may include, for example, Virtual Reality (VR) content that may be rendered in a computer-simulated environment. The media content may be rendered on a plurality of head-mounted display (HMD) devices associated with the multiple viewers (also referred to as wearers of such devices). The emotional state information may include a time-series of emotional states of the wearer of each of the plurality of HMD devices. Examples of an emotional state may include, but are not limited to, a sad state, a happy state, a neutral state, a surprised state, a fear state, a nervous state, or a disgust state.

To modify the rendered media content, the electronic device may determine the emotional state information associated with a wearer of each of the plurality of HMD devices. The determined emotional state information may correspond to a first portion of the rendered media content.

For example, the first portion may include a set of image frames, a set of audio samples, a text portion of a subtitle or closed caption, a region of interest in an image frame of a video, or a combination thereof. The electronic device may construct an input feature for a first neural network based on the first portion of the rendered media content and the determined emotional state information. Further, the electronic device may select a first content modification operation from a set of content modification operations associated with the rendered media content. The selection of the first content modification operation may be based on application of the first neural network on the constructed input feature. Examples of the first content modification operation may include, but is not limited to, a modification on an audio playback of the first portion, a modification on a subtitle or a closed caption data in the first portion, a modification on a display of the first portion, a masking operation on a region of interest (ROI) in the first portion, or a blur operation on the ROI in the first portion. The electronic device may be configured to modify the rendered media content based on the selected first content modification operation. The modified media content may be rendered on at least one of the plurality of HMD devices.

In one scenario, the modified media content may be rendered to cause a change in the emotional state of a wearer from an unexpected or undesirable state to a more normative or expected emotional state. Unmodified media content may still be rendered on remaining HMD devices for other wearers. In another scenario, the electronic device may enable each wearer to select a level of detail of information to be displayed on their respective HMD device. Individual wearers may be provided with an opportunity for customization of information from automatically curated information that may be displayed on the respective HMD device, based on selection of a level of detail suitable for their level of understanding of a topic. This may further enhance the understanding of the wearers and may help them to effectively consume the media content in a shared session among the plurality of HMD devices. In another scenario, each wearer may be able to navigate to a certain portion and view the portion of the media content, irrespective of which portion is rendered on the HMD devices of the other wearers. Instead of a traditional linear content delivery, this may allow the wearer to consume the media content in a non-linear fashion, through a respective HMD device.

In another scenario, the electronic device may enable each wearer of an HMD device to leave a shared session at any time instant or to rejoin the shared session after a break. In case a wearer of an HMD device rejoins the shared session after a break, the HMD device may render the same media content which may be rendered on other HMD devices in the same shared session. In another scenario, emotional states of each wearer may be monitored to decide actions, such as to pause a playback of the media content or to resume the paused playback after the media content.

FIG. 1 is a block diagram that illustrates an exemplary network environment for content modification in a shared session among multiple head-mounted display (HMD) devices, in accordance with an embodiment of the disclosure. With reference to FIG. 1, there is shown a network environment 100. The network environment 100 may include an electronic device 102, a plurality of head-mounted display (HMD) devices 104, a first Neural Network 106 implemented on the electronic device 102, and a content source 108. The electronic device 102 may be communicatively coupled to the plurality of HMD devices 104, via a communication network 112. There are further shown wearers 110A, 110B . . . 110N (e.g., a first wearer 110A, a second wearer 110B, . . . , and an Nth wearer 110N) of the plurality of HMD devices 104, such as a first HMD device 104A, a second HMD device 104B, . . . , and Nth HMD device 104N). The number of HMD devices in FIG. 1 are presented merely as an example and should not be construed as limiting for the disclosure. The plurality of HMD devices 104 may include only two HMD device or more than two HMD devices, without a deviation from the scope of the disclosure.

The electronic device 102 may include suitable logic, circuitry, code, and/or interfaces that may be configured to determine emotional state information associated with the wearers 110A, 110B . . . 110N of the plurality of HMD devices 104 and modify the media content based on the emotional state information. The modified media content may be rendered on at least one of the plurality of HMD devices 104. Examples of the electronic device 102 may include, but are not limited to, an image/video editing machine, a server, a desktop computer, a laptop computer, a tablet computer, a computer work-station, a mainframe machine, a gaming device, an eXtended Reality (XR) device, a Virtual Reality (VR) device, an Augmented Reality (AR) device, a Mixed Reality (MR) device, a smartphone, a mobile phone, and/or any consumer electronic (CE) device.

Each HMD device of the plurality of HMD devices 104 may include suitable logic, circuitry, code and/or interfaces that may be configured to render the media content in a computer-simulated environment. In accordance with an embodiment, each HMD device may be a wearable device with a display to render the media content and one or more sensors to acquire emotional state information of a respective wearer while the media content is rendered. As an example, the first HMD device 104A may include a ring of electrodes. One or more sensors (such as one or more image-capturing devices and/or pressure sensors) of the first HMD device 104A may be configured to detect pressure points on a face or a head of the wearer when the first HMD device 104A is placed on or worn by the wearer of the first HMD device 104A. In a worn state, the first HMD device 104A may apply a fixed pressure on certain points on the face of the wearer of the HMD device 104A. In some instances, the fixed pressure on certain points may be treated as a baseline or a reference when signals associated with facial expressions are detected.

As each facial expression may involve a specific pattern in movement of bones, muscles, and skin on the face, the ring of electrodes may acquire facial muscle signals (e.g., Facial Electromyography (fEMG) signals) from the face of the wearer. Each HMD device may include a signal processing unit to pre-process the facial muscle signals. In an embodiment, each HMD device may determine a timeseries of emotional states associated with a respective wearer based on the pre-processed facial muscle signals. The facial expression may be indicative of an emotional state of the wearer at a specific time instant. In an embodiment, each HMD device may generate a virtual avatar of a wearer based on the facial expression. The generated virtual avatar may be shared with at least one HMD device or the electronic device 102. Examples of the plurality of HMD devices 104 may include, but are not limited to, a smart glass, an XR display, a VR-based HMD, an AR-based HMD, an MR-based HMD, or a VR/AR/MR-based device/accessory associated with a smart phone or a gaming console.

The first neural network 106 may be trained on a recommendation task to determine a content modification operation (i.e. an action) that may be suitable for modification of at least a first portion of the media content, based on an emotional state information of the wearers of the plurality of HMD devices 104. The first neural network 106 may determine the content modification operation (i.e. an action) from among a set of content modification operations (i.e. an action space) associated with the media content.

The first neural network 106 may be defined by its hyper-parameters, for example, a neural network topology (e.g., a number of layers, a number of neurons/nodes per layer, and the like) activation function(s), number of weights, cost function, regularization function, input size, and the like. The first neural network 106 may be referred to as a computational network or a system of artificial neurons (also referred to as nodes). The nodes of the first neural network 106 may be arranged in a plurality of layers, as defined in a neural network topology of the first neural network 106. The plurality of layers of the first neural network 106 may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the first neural network 106. Outputs of each hidden layer may be coupled to inputs of at least one node in other layers of the first neural network 106. Node(s) in the final layer may receive inputs from at least one hidden layer to output a result. The number of layers and the number of nodes in each layer may be determined from the hyper-parameters of the first neural network 106. Such hyper-parameters may be set before or while training the first neural network 106 on a training dataset.

Each node of the first neural network 106 may correspond to a mathematical function (e.g., a sigmoid function or a rectified linear unit) with a set of parameters, tunable at a training stage of the first neural network 106. The set of parameters may include, for example, a weight parameter, a regularization parameter, and the like. Each node may use the mathematical function to compute an output based on one or more inputs from nodes in other layer(s) (e.g., previous layer(s)) of the first neural network 106. All or some of the nodes of the first neural network 106 may correspond to same or a different same mathematical function.

In training of the first neural network 106, one or more parameters (such as node weights) of each node of the first neural network 106 may be updated based on whether an output of the final layer for a given input (from the training dataset) matches a correct result based on a loss function for the first neural network 106. The above process may be repeated for same or a different input until a minima of loss function is achieved, and a training error is minimized. Several methods for training are known in the art, for example, gradient descent, stochastic gradient descent, batch gradient descent, gradient boost, meta-heuristics, and the like. For example, by use of an optimization algorithm, such as gradient descent, a global optimum of the loss function may be determined. When the global optimum is determined, the training error of the first neural network 106 may be minimized and the first neural network 106 may be considered as trained.

In an embodiment, the first neural network 106 may include electronic data, which may be implemented as, for example, a software component of an application executable on the electronic device 102. The first neural network 106 may rely on libraries, external scripts, or other logic/instructions for execution by a processing device, such as the electronic device 102. The first neural network 106 may include computer-executable codes or routines to enable a computing device, such as the electronic device 102 to perform one or more operations to determine a suitable content modification operation (i.e. an action) to modify the media content rendered on the plurality of HMD devices 104. Additionally, or alternatively, the first neural network 106 may be implemented using hardware, including but not limited to, a processor, a microprocessor (e.g., to perform or control performance of one or more operations), a field-programmable gate array (FPGA), or an application-specific integrated circuit (ASIC). For example, an inference accelerator chip may be included in the electronic device 102 to accelerate computations and inference of the first neural network 106. In some embodiments, the first neural network 106 may be implemented using a combination of both hardware and software.

Examples of the first neural network 106 may include, but are not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), (You Only Look Once) YOLO network, a Long Short Term Memory (LSTM) network based RNN, CNN+ANN, LSTM+ANN, a gated recurrent unit (GRU)-based RNN, a fully connected neural network, a Connectionist Temporal Classification (CTC) based RNN, a deep Bayesian neural network, a Generative Adversarial Network (GAN), a Residual Neural Network (Res-Net), a Feature Pyramid Network (FPN), a Retina-Net, a Single Shot Detector (SSD), and/or a combination of such networks. In some embodiments, the first neural network 106 may implement numerical computation techniques using data flow graphs. In certain embodiments, the first neural network 106 may be based on a hybrid architecture of multiple Deep Neural Networks (DNNs).

The content source 108 may include suitable logic, circuitry, code, and/or interfaces that may be configured to transmit media content to the electronic device 102. In an embodiment, the media content may be a XR content, such as a 360-degree video, a 3D animation, or a VR/AR/MR game content. In these or other embodiments, the media content may be rendered with interactive options which may enable the wearers of the plurality of HMD devices 104 to interact with the media content. In an embodiment, the media content may include audio content and video content (in equirectangular format) associated with the audio content. For example, if the media content is a television program, then the audio content may include a background audio, actor voice or speech, and other audio components, such as audio description. In addition to audio/video content, the media content may also include other components, such as text (e.g., subtitles or closed caption text), overlay graphics, and/or animations associated with the audio/video content.

In an embodiment, the content source 108 may be implemented as a storage device which may store the media content. Examples of such an implementation of the content source 108 may include, but are not limited to, a compact disk drive, a portable storage drive, a flash drive, a Hard Disk Drive (HDD), a Solid-State Drive (SSD), and/or a Secure Digital (SD) card. In another embodiment, the content source 108 may be implemented as a media streaming server, a cloud server, or a cluster of cloud servers, which may transmit the media content to the electronic device 102, via the communication network 112.

The communication network 112 may include a communication medium through which the electronic device 102 may communicate with the plurality of HMD devices 104, and the content source 108. The communication network 112 may be established as one of a wired connection or a wireless connection. Examples of the communication network 112 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 112 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic device 102 may receive a request from one or more of the plurality of HMD devices 104 to start a shared session (such as a shared XR session). Based on the received request, the electronic device 102 may receive the media content from the content source 108. In an embodiment, the content source 108 may be a storage device of a content owner, a content broadcaster, or a content distributer with a license or right to store and distribute the media content. An owner or an organization associated with the electronic device 102 may have a subscription/agreement with an owner or an organization associated with the content source 108 for usage and distribution of the media content. The electronic device 102 may transmit the media content to each of the plurality of HMD devices 104. Each of the plurality of HMD devices 104 may be configured to receive the transmitted media content and render the received media content in a computer-simulated environment, as part of the shared session.

The electronic device 102 may be configured to determine emotional state information associated with a wearer of each of the plurality of HMD devices 104. The determined emotional state information may correspond to a first portion of the rendered media content. Specifically, the emotional state information may be determined while the first portion of the media content is rendered on each of the plurality of HMD devices 104. The determined emotional state information may include a time-series of emotional states of the wearers 110A, 110B . . . 110N of the plurality of HMD devices 104. Examples of each emotional state in the time-series of emotional states include, but is not limited to, a sad state, a happy state, a neutral state, a surprised state, a fear state, a nervous state, or a disgust state.

Figure 3:
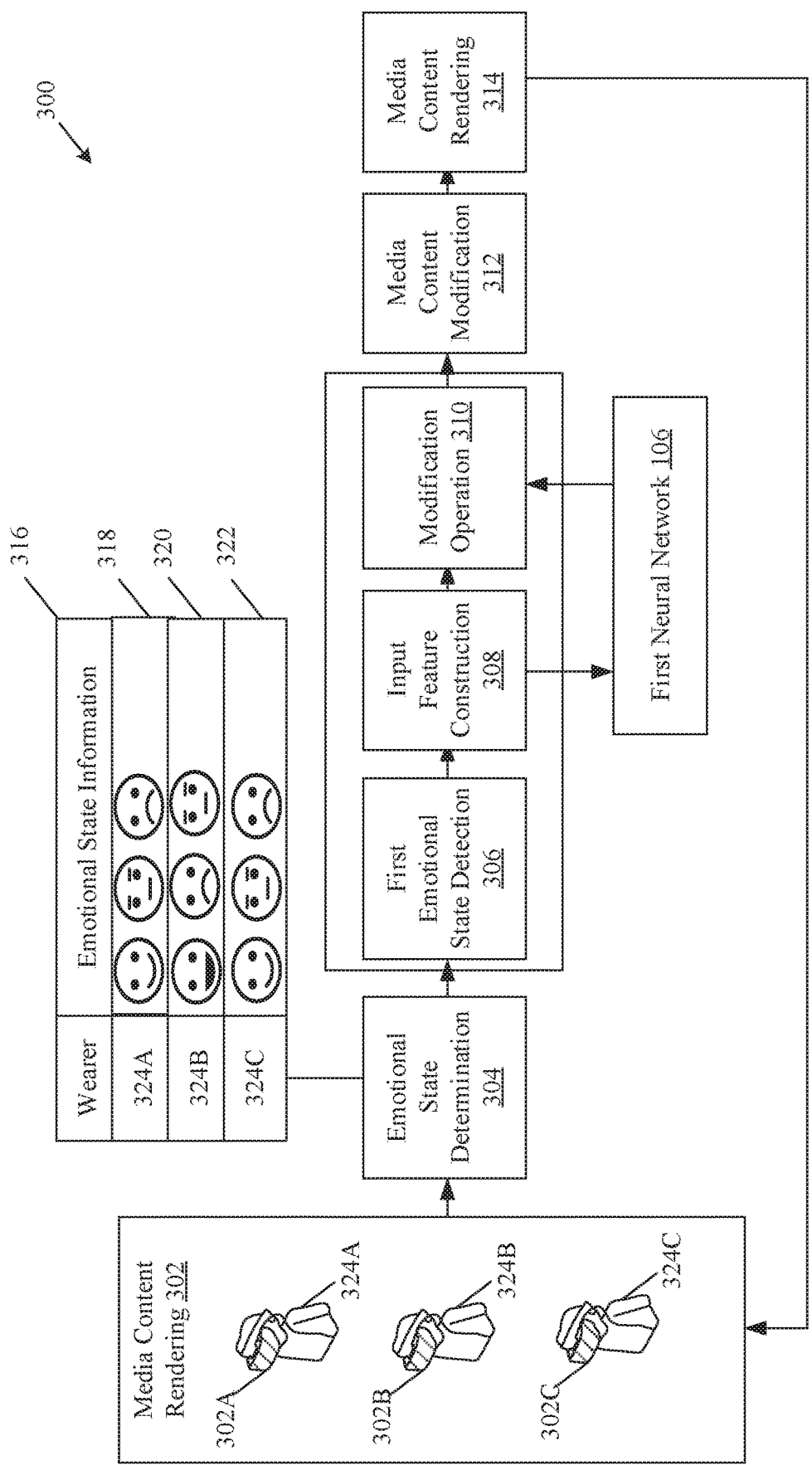
FIG. 3 is a diagram that illustrate exemplary operations for an automated content modification in a shared session among multiple head-mounted display (HMD) devices, in accordance with an embodiment of the disclosure.

The electronic device 102 may construct an input feature for the first neural network 106 based on the first portion of the rendered media content and the determined emotional state information, as described for example, in FIG. 3. Based on application of the first neural network 106 on the constructed input feature, the electronic device 102 may select a first content modification operation from among a set of content modification operations associated with the rendered media content. Examples of the selected first content modification operation may include, but are not limited to, a first modification applicable on an audio playback of the first portion, a second modification applicable on a subtitle or a closed caption data in the first portion, a third modification applicable on a display of the first portion, a masking operation on a region of interest (ROI) in the first portion, or a blur operation applicable on the ROI. The electronic device 102 may modify the rendered media content based on the selected first content modification operation (as described, for example, in FIG. 3). The modified media content may be rendered on one or more HMD devices of the plurality of HMD devices 104.

In an embodiment, based on the emotional state information, the electronic device 102 may detect a first emotional state to be different from a set of normative emotional states for the first portion of the rendered media content. For example, if the media content is a tutoring video on a certain topic, then a sad or a nervous state of emotion may be detected as different a set of normative emotions states, such as a happy state, or a neutral state. The first emotional state may be detected to be associated with the first wearer 110A of the first HMD device 104A of the plurality of HMD devices 104. In such a case, the modified media content may be rendered on the first HMD device 104A.

For example, the first wearer 110A may exhibit a disgust emotion when the first wearer 110A (e.g., a child) may view objectionable content (within a region of interest) in the first portion of the media content. For example, the objectionable content may be a depiction of an objectionable event, crime, or violence in the first portion of the media content. In such a case, the first content modification operation may be selected as a masking operation or blurring operation, applicable on the region of interest in the first portion of the media content. Based on the selected first content modification operation, the electronic device 102 may modify the media content by application of the masking operation or a blurring operation on the region of interest (which depicts the objectionable content). The first HMD device 104A may render the modified media content, where the region of interest is masked or blurred. The modified media content may be rendered to cause a change in the emotional state of the first wearer 110A from the disgust state to a more normative or expected emotional state, such as a neutral state. Further, unmodified media content may still be rendered on each of remaining HMD devices 104B . . . 104N for other wearers 110B . . . 110N.

Figure 2:
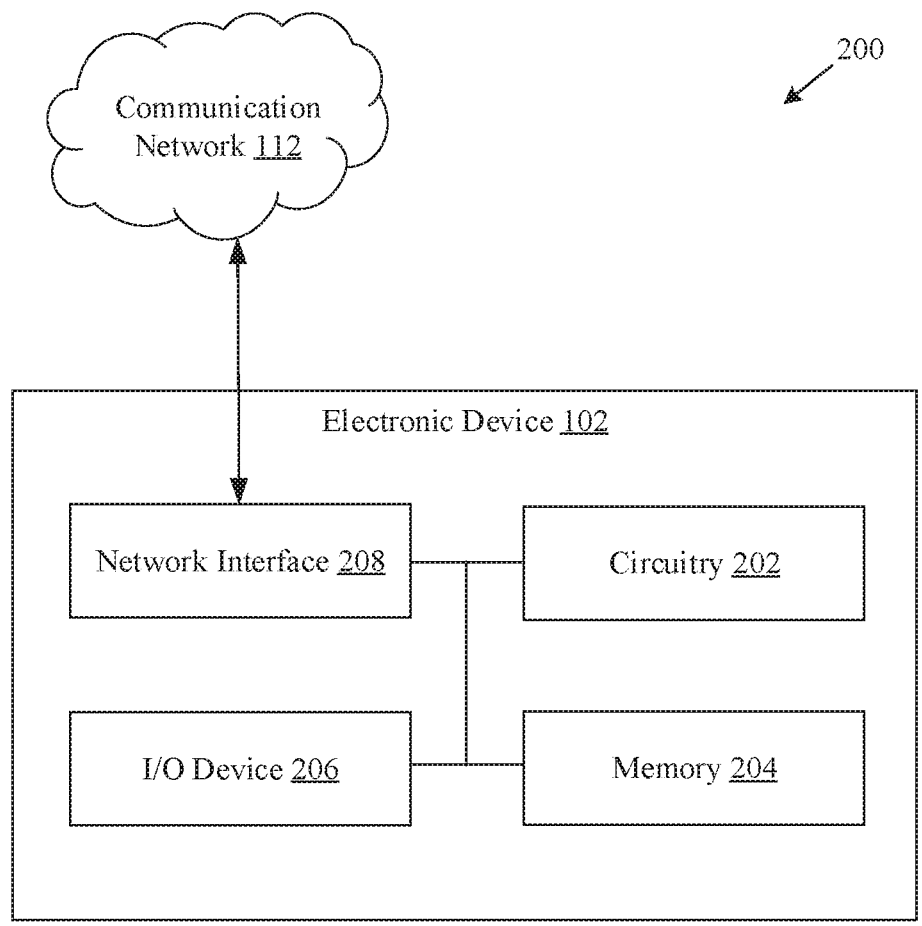
FIG. 2 is a block diagram that illustrates an exemplary electronic device for content modification in a shared session among multiple head-mounted display (HMD) devices, in accordance with an embodiment of the disclosure.

FIG. 2 is a block diagram that illustrates an exemplary electronic device for content modification in a shared session among multiple head-mounted display (HMD) devices, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, an input/output (I/O) device 206, and a network interface 208. The circuitry 202 may be communicatively coupled to the memory 204, the I/O device 206, and the network interface 208.

The circuitry 202 may include suitable logic, circuitry, and/or interfaces that may be configured to execute program instructions associated with different operations to be executed by the electronic device 102. For example, some of the operations may include determination of the emotional state information, construction of the input feature for the first neural network 106, selection of the first content modification operation, and modification of the rendered media content. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, and/or interfaces that may be configured to store the program instructions executable by the circuitry 202. In at least one embodiment, the memory 204 may be configured to store the emotional state information, the first portion of the rendered media content, and the first neural network 106. The memory 204 may be configured to store the set of content modification operations associated with the rendered media content. Example implementations of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. The I/O device 206 may include various input and output devices, which may be configured to communicate with the circuitry 202. For example, the electronic device 102 may receive a user input via the I/O device 206 to select a first content modification operation from the set of content modification operations or select a first HMD device 104A from the plurality of HMD devices 104. Examples of the I/O device 206 may include, but are not limited to, a touch screen, a keyboard, a mouse, a joystick, a display device, a microphone, or a speaker. In an embodiment, the electronic device 102 may receive a user input via hand-gesture (for Ok" sign, "thumb-up" sign, "thumb-down" sign, "clap" sign) of the wearers 110B . . . 110N. Examples of the I/O device 206 may include, for example, a remote camera or a haptic sensor.

The network interface 208 may include suitable logic, circuitry, interfaces, and/or code that may be configured to facilitate the circuitry 202 to communicate with the plurality of HMD devices 104 and/or other devices (e.g., the content source 108), via the communication network 112. The network interface 208 may be implemented by use of various known technologies to support wired or wireless communication of the electronic device 102 with the communication network 112. The network interface 208 may include, for example, an antenna, a radio frequency (RF) transceiver, one or more amplifiers, a tuner, one or more oscillators, a digital signal processor, a coder-decoder (CODEC) chipset, a subscriber identity module (SIM) card, a local buffer circuitry, and the like. The network interface 208 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, or a Short Message Service (SMS).

The functions or operations executed by the electronic device 102, as described in FIG. 1, may be performed by the circuitry 202. Operations executed by the circuitry 202 are described in detail, for example, in FIG. 3, FIG. 4, FIG. 5A, FIG. 5B, FIG. 5C, FIG. 6, FIG. 7A, FIG. 7B, FIG. 7C, FIG. 8, FIG. 9, FIG. 10, and FIG. 11.

FIG. 3 is a diagram that illustrate exemplary operations for an automated content modification in a shared session among multiple head-mounted display (HMD) devices, in accordance with an embodiment of the disclosure. FIG. 3 is explained in conjunction with elements from FIG. 1 and FIG. 2. With reference to FIG. 3, there is shown a block diagram 300 that illustrates exemplary operations from 302 to 314, as described herein. The exemplary operations illustrated in the block diagram 300 may start at 302 and may be performed by any computing system, apparatus, or device, such as by the electronic device 102 of FIG. 1 or FIG. 2. Although illustrated with discrete blocks, the exemplary operations associated with one or more blocks of the block diagram 300 may be divided into additional blocks, combined into fewer blocks, or eliminated, depending on implementation of the exemplary operations.

At 302, media content may be rendered. In an embodiment, the circuitry 202 may be communicatively coupled to a plurality of HMD devices 302A, 302B, and 302C. The circuitry 202 may acquire the media content from the content source 108. The circuitry 202 may transmit the acquired media content to each of the plurality of HMD devices 302A, 302B, and 302C. Each HMD device (e.g., a first HMD device 302A, a second HMD device 302B, and a third HMD device 302C) may be configured to generate a computer-simulated environment and render the media content in the generated computer-simulated environment. The computer-simulated environment may be, for example but not limited to, an XR environment, VR environment, an augmented reality (AR) environment, or a mixed reality (MR) environment, or a combination thereof. The media content may be rendered while the plurality of HMD devices 302A, 302B, and 302C is worn by wearers, such as a first wearer 324A, a second wearer 324B, and a third wearer 324C.

At 304, emotional state information may be determined. In an embodiment, the circuitry 202 may be configured to determine the emotional state information associated with a wearer (such as, the first wearer 324A, the second wearer 324B, or the third wearer 324C) of each of the plurality of HMD devices 302A, 302B, and 302C. The determined emotional state information may correspond to a first portion of the rendered media content. The first portion of the rendered media content may include, but is not limited to, a set of image frames, a set of audio samples, a set of sub-title/closed caption texts, or a region of interest in a frame of image or video in the rendered media content.

In an embodiment, each HMD device of the plurality of HMD devices 302A, 302B, and 302C may include one or more sensors, such as, an array of non-invasive electrodes in contact with the head of a respective wearer. Such electrodes may acquire brain wave signals (or Electroencephalogram (EEG) signals) from the head of the respective wearer. Each HMD device may include a signal processing unit to pre-process the brainwave signals. In an embodiment, each HMD device may determine a timeseries of emotional states associated with a respective wearer based on the pre-processed brainwave signals. In such a case, the circuitry 202 may determine the emotional state information based on a retrieval of the timeseries of emotional states from each HMD device of the plurality of HMD devices 302A, 302B, and 302C. In another embodiment, the circuitry 202 may receive the pre-processed brainwave signals from each HMD device of the plurality of HMD devices 302A, 302B, and 302C and may determine the emotional state information of a wearer of each HMD device of the plurality of HMD devices 302A, 302B, and 302C based on the received brainwave signals. For example, the circuitry 202 determine a functional connectivity or a dependency between different regions of brain of a wearer of an HMD device based on the received brainwave signals. Such determination may be based on a neural network, which may be trained to map the brainwave signals to the functional connectivity or the dependency between different regions of the brain. In such a scenario, specific descriptors may be extracted from EEG data in order to determine emotional state of the wearer. For example, specific emotion-related signals in the EEG data may be related to brain activity in certain parts of the brain. If, based on the EEG data, certain part(s) of the brain are found to be more active than others, then an emotional state linked to such part(s) of the brain may be determined. In some embodiments, in addition to the EEG data, other vital data, such as GSR, heart rate, or body temperature, may be analyzed together with the EEG signals to determine emotional state(s) of the wearer. Information associated with such functional connectivity or dependency may be used to determine at least one emotional state of the wearer. Examples of an emotional state in the time-series of emotional states may include, but not limited to, a sad state, a happy state, a neutral state, a surprised state, a fear state, a nervous state, or a disgust state.

In an embodiment, the circuitry 202 may store the emotional state information associated with the wearers 324A, 324B, and 324C of the plurality of HMD devices 302A, 302B, and 302C in the memory 204. Such information may be stored as a lookup table (such as a table 316). As an example, a first row 318 of the table 316 may indicate a time-series of emotional states associated with the first wearer 324A of the first HMD device 302A. The time-series of emotional states in the first row 318 may correspond to the first portion of the rendered media content and may include, for example, a happy state, a neutral state, and an unhappy state. As another example, a second row 320 of the table 316 may indicate a time-series of emotional states associated with the second wearer 324B of the second HMD device 302B and a third row 322 of the table 316 may indicate a time-series of emotional states associated with the third wearer W3 324C of the third HMD device 302C.

The time-series of emotional states in the second row 320 may also correspond to the first portion of the rendered media content and may include, for example, a happy state, an unhappy state, and a neutral state. Similarly, the time-series of emotional states in the third row 322 may also correspond to the first portion of the rendered media content and may include, for example, a happy state, a neutral state, and an unhappy state.

At 306, a first emotional state may be detected. In an embodiment, the circuitry 202 may be configured to detect, based on the emotional state information (determined at 304), a first emotional state to be different from a set of normative emotional states for the first portion of the rendered media content. The set of normative emotional state may be referred to as a standard, benchmark, or expected emotional state of a wearer of an HMD device for the first portion of the media content, including any content similar to the first portion of the rendered media content. As an example, the first portion of the rendered media content may include a romantic scene which may be associated with a normative emotional state of a happy emotional state. If the first emotional state of the first wearer 324A is detected as a surprise or sad emotional state for the romantic scene in the first portion of the rendered media content, then the circuitry 202 may detect the first emotional state to be different from normative states, such as a happy or neural state. The first emotional state may be detected to be associated with the first wearer 324A of the first HMD device 302A. In such a case, the circuitry 202 may modify the media content for the first wearer 324A and the modified media content may be rendered on the first HMD device 302A. The modification of the media content is described further at 312, for example. Further, the rendering of the modified media content is described further at 314, for example.

At 308, an input feature may be constructed. In an embodiment, the circuitry 202 may be configured to construct the input feature for the first neural network 106 based on the first portion of the rendered media content and the determined emotional state information. The electronic device 102 may input the constructed input feature to the first neural network 106 that may be trained for an operation selection task. The operation selection task may be associated with a single content modification operation or multiple content modification operations. For example, if the first portion of the rendered media content includes only an audio playback, then the operation selection task may be associated with selection of a content modification operation applicable on an audio playback of the first portion. Otherwise, if the first portion includes video content, the operation selection task may be associated with selection of a content modification operation applicable on the video content, a content modification operation applicable on audio playback, and/or a content modification operation applicable a subtitle or a closed caption data included the first portion of the rendered media content. In at least one embodiment, the first neural network 106 may be trained to output a result, indicative of a selection of at least one content modification operation from among a set of content modification operations associated with the rendered media content. Details associated with the training of the first neural network 106 are provided, for example, in FIG. 10.

At 310, a modification operation may be selected. In an embodiment, the circuitry 202 may be configured to select a first content modification operation from among the set of content modification operations associated with the rendered media content. Such selection may be based on application of the first neural network 106 on the constructed input feature.

For example, the circuitry 202 may pass the constructed input feature as input to an input layer of the first neural network 106. The first neural network 106 may output a set of likelihood scores corresponding to the set of content modification operations. The circuitry 202 may select the first content modification operation as one which may be associated with a maximum likelihood score from among the output of likelihood scores. In case the rendered media content is an audio/video content, then the set of content modification operations associated with the rendered media content may include, for example, a first modification applicable on an audio playback of the first portion, a second modification applicable on a subtitle or a closed caption data in the first portion of the rendered media content, or a third modification applicable on a display of the first portion.

At 312, the media content may be modified. In an embodiment, the circuitry 202 may modify the rendered media content based on the selected first content modification operation. As an example, the rendered media content may correspond to a movie that may be viewed in a shared session by the wearers 324A, 324B, and 324C, and the first portion may correspond to a fight scene in the movie. The fight scene may include usage of abusive words and may depict violence and blood-shed that may not be appropriate for a certain age group (such as below 16 years of age) of wearers or sensitive wearers who may experience a fear when the fight scene is rendered. In such a case, the selected first content modification operation may be a first modification applicable on an audio playback of the first portion, or the display of the first portion. The circuitry 202 may modify the media content to be rendered on an HMD device of a wearer of a particular age group (e.g., a wearer below 16 years of age) or a wearer who may be detected to experience a fear (i. e. emotional state) while viewing the first portion of the media content. For example, the circuitry 202 may modify the media content for such wearers such that the audio playback (which includes abusive words) may be muted, the display of the first portion may be disabled as a whole, or regions associated with the fight scene in the first portion may be blurred/masked to hide the violence or blood-shed.

At 314, the modified media content may be rendered. In an embodiment at least one of the plurality of HMD devices 302A, 302B, and 302C may receive the modified media content from electronic device 102 and may render the modified media content. While the wearers 324A, 324B, and 324C may be watching the same media content in the shared virtual reality session through a respective HMD device of the plurality of HMD devices 302A, 302B, and 302C, emotional states of two or more wearers (from the wearers 324A, 324B, and 324C) may or may not be same when viewing a portion of the rendered media content.

In an embodiment, if the first wearer 324A is detected to be associated with a first emotional state different from normative or expected emotional states for the first portion of the media content, then the modified media content may be rendered on the first HMD device 302A. Information associated with such normative or expected emotional states may be included with the media content as metadata or may be specified by one of the wearers 324A, 324B, and 324C. While the first HMD device 302A may be rendering the modified media content, other HMD devices, such as the second HMD device 302B and the third HMD device 302C may continue to render the media content without any modification.

For example, the media content may be a movie and the first portion of the media content may include a fight sequence. The first wearer 324A may be a child who may experience an emotional state of fear while viewing the fight sequence. The second wearer 324B may be an aged person who may experience an emotional state of disgust while viewing the same fight sequence. The third wearer 324C may be a middle-aged person who may enjoy thrillers and action movies and may have a neutral emotional state while viewing the same fight sequence. In this case, if the circuitry 202 determines the neutral emotional state as a normative emotional state for the first portion, the circuitry 202 may detect the emotional states of fear and disgust as instances of emotional states which are different from the normative emotional state.

For each of the first wearer 324A and the second wearer 324B, the circuitry 202 may construct the input feature for the first neural network 106, as described at 308. For example, the input feature for the first wearer 324A may be constructed based on information associated with the fear state and the first portion of the media content. Similarly, the input feature for the second wearer 324B may be constructed based on information associated with the disgust state of emotion and the first portion of the media content. Based on the application of the first neural network 106 on each of the two input features, the circuitry 202 may select a first content modification operation for each of the first wearer 324A and the second wearer 324B. The circuitry 202 may apply the selected first content modification operations on the media content to modify the media content for each of the first wearer 324A and the second wearer 324B.

In some embodiments, the first content modification operations for the first wearer 324A and the second wearer 324B may be same and the modified media content which may be rendered on the respective HMD devices of the first wearer 324A and the second wearer 324B, may also be same. For example, the first content modification operation may include an application of a masking/blurring operation on a region of interest (e.g. a gunshot wound) within each image frame of the first portion (a fight sequence). The circuitry 202 may track the region of interest within the entire image sequence in the first portion of the media content. Based on the track, the circuitry 202 may apply a mask on the region of interest or may blur the region of interest in each image frame of the image sequence.

In another embodiment, the first content modification operation for each of the first wearer 324A and the second wearer 324B may be different, and thus the modified media content to be rendered on the respective HMD devices of the first wearer 324A and the second wearer 324B may also be different. For example, the first content modification operation for the first wearer 324A may include an application of a mask/blur on a region of interest in the first portion, which may be associated with the fight scene. Further, the first content modification operation for the second wearer 324B may include an application of a mute operation on an audio portion of the first portion. After the modification is done, each of the first HMD device 302A and the second HMD device 302B may render the modified media content. Further, the third HMD device 302C may still render unmodified media content for the third wearer 324C as the third wearer 324C experiences a normative emotional state while viewing the first portion of the media content. Thus, if a wearer of an HMD device goes through an unexpected or undesirable emotional state when the media content is rendered on the HMD device, the rendered media content may be modified to normalize the emotional state for the wearer to improve the wearer's experience in the computer-simulated environment.

Figure 4:
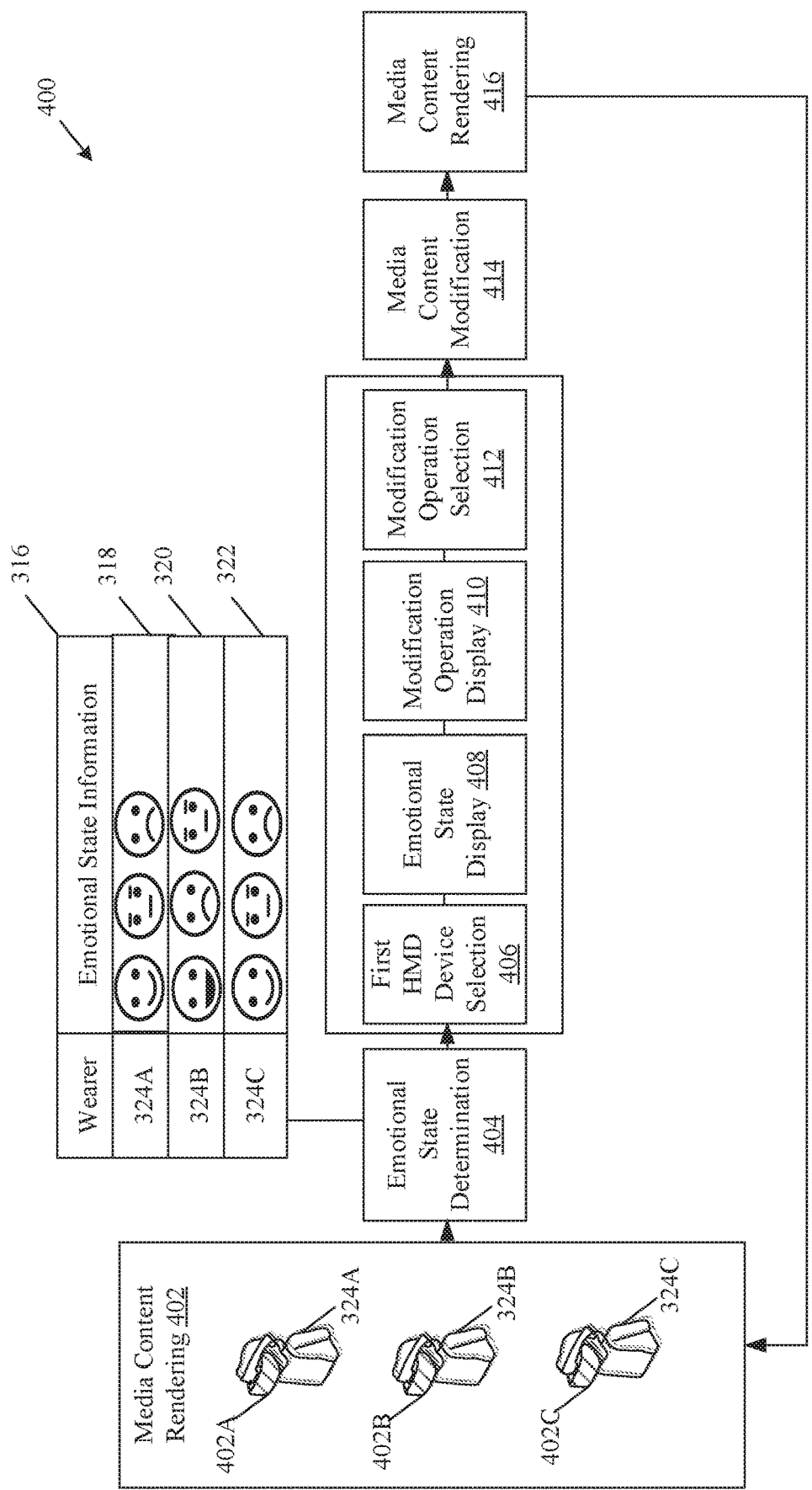
FIG. 4 is a diagram that illustrate exemplary operations for a manual control over content modification in a shared session among multiple head-mounted display (HMD), in accordance with an embodiment of the disclosure.

FIG. 4 is a diagram that illustrate exemplary operations for a manual control over content modification in a shared session among multiple head-mounted display (HMD), in accordance with an embodiment of the disclosure. FIG. 4 is explained in conjunction with elements from FIGS. 1, 2, and 3. With reference to FIG. 4, there is shown a block diagram 400 that illustrates exemplary operations from 402 to 416, as described herein. The exemplary operations illustrated in the block diagram 400 may start at 402 and may be performed by any computing system, apparatus, or device, such as by the electronic device 102 of FIG. 1 or FIG. 2. Although illustrated with discrete blocks, the exemplary operations associated with one or more blocks of the block diagram 400 may be divided into additional blocks, combined into fewer blocks, or eliminated, depending on implementation of the exemplary operations.

At 402, media content may be rendered. The circuitry 202 may be communicatively coupled to a plurality of HMD devices 402A, 402B, and 402C. Each HMD device of the plurality of HMD devices 402A, 402B, and 402C may render the media content in a computer-simulated environment, as described, for example, at 302 in FIG. 3

At 404, emotional state information may be determined. In an embodiment, the circuitry 202 may determine the emotional state information associated with a wearer (such as the first wearer 324A, the second wearer 324B, or the third wearer 324C) of each of the plurality of HMD devices 402A, 402B, and 402C, as described, for example, at 304 in FIG. 3.

The circuitry 202 may store the emotional state information in the memory 204 as a look-up table (e.g., the table 316) which includes the first row 318, the second row 320, and the third row 322. Each of the first row 318, the second row 320, and the third row 322 may include a time series of the emotional states of a respective wearer of an HMD device. The time series of the emotional states may be associated with a time period corresponding to a duration of the first portion of the media content. Details related to the emotional state information in the table 316 are further explained, for example, at 304 of FIG. 3.

At 406, the first HMD device 402A may be selected. In an embodiment, the circuitry 202 may select the first HMD device 402A of the plurality of HMD devices 402A, 402B, and 402C to operate as a master device in a master-slave configuration of the plurality of HMD devices 402A, 402B, and 402C. All the remaining HMD devices, such as the second HMD device 402B and the third HMD device 402C may be selected to operate as slave devices in the master-slave configuration. The master-slave configuration may allow the master device (such as the first HMD device 402A) to view the emotional state information associated with each slave device (such as the HMD device 402B and the third HMD device 402C). The wearer (such as the first wearer 324A) associated with the master device (such as the first HMD device 402A) may be presented with options to apply suitable content modification operation(s) on the media content rendered on the slave devices.

At 408, the emotional state information may be rendered. In an embodiment, the circuitry 202 may control the selected first HMD device 402A to display the determined emotional state information. In an embodiment, the first HMD device 402A may render an avatar of each wearer associated with the slave devices. At any time-instant, the facial expression of the avatar may be updated based on the emotional state information, to emulate an emotional state of a respective wearer associated with a slave device. The slave devices (such as the second and the third HMD devices 402B and 402C) may render the first portion of the rendered media content, which may also be rendered on the master device (such as the first HMD device 402A).

In an embodiment, the master device (such as the first HMD device 402A) may receive the emotional state information of a wearer (such as the second wearer 324B and the third wearer 324C) of each of the slave devices (such as the second HMD device 402B and the third HMD devices 402C) from the respective slave devices. In an embodiment, the first HMD device 402A may overlay the emotional state information over the rendered media content, as described for example, in FIG. 5A.

At 410, modification operations may be displayed. In an embodiment, the circuitry 202 may be configured to determine a set of content modification operations associated with the rendered media content based on the determined emotional state information. For example, the circuitry 202 may determine the set of content modification operations as one or more user-selectable options, which when selected, may modify a portion of the rendered media content (e.g., audio, video, image, graphic, or subtitle text). Examples of the set of content modification operations may include, but are not limited to, a modification on an audio playback of the first portion, a modification on a subtitle or closed caption data in the first portion, a modification on a display of the first portion, or a mask/blur operation on a region of interest in the first portion. In certain embodiments, the set of content modification operations may be pre-stored in the memory 204 and the circuitry 202 may extract the set of content modification operations from the memory 204. The circuitry 202 may control the selected first HMD device 402A to display the set of content modification operations.

At 412, a modification operation may be selected from the displayed set of content modification operations. In an embodiment, the circuitry 202 may be configured to select a first content modification operation from the displayed set of content modification operations based on a user input via the selected first HMD device 402A. As the selection may not require the application of the first neural network 106, the first content modification operation may be selected entirely based on the user input.

As an example, the first portion may include an inappropriate dialogue, and the emotional state information of a wearer (e.g., the second wearer 324B) of a slave device (e.g., the second HMD device 402B) may represent a disgust state. In such a case, the first HMD device 402A (i.e. the master device) may receive a user input which may include a selection of option (such as a user interface (UI) element) to apply a first modification operation on a subtitle or closed-caption data included in the first portion of the media content (which may be rendered on the slave device (e.g., the second HMD device 402B)). The media content may be modified and censored for individual wearers of the slave HMD devices based on whether the emotional states of such wearers warrants such a modification to the first portion of the media content. The user input represents a human intervention in selection of an appropriate modification operation for the first portion of the media content. The wearer of the master device may monitor such emotional states for content modification.

At 414, the media content may be modified. In an embodiment, the circuitry 202 may be configured to modify the rendered media content based on the selected first content modification operation, as described for example, at 312 in FIG. 3

At 416, the modified media content may be rendered. In an embodiment the circuitry 202 may be configured to transfer the modified media content to one or more HMD devices, such as the slave devices. At least one of such HMD devices may render the modified media content, as described for example, at 314 in FIG. 3. For example, the modified media content may be rendered on the second HMD device 302B whose wearer may have experienced an emotional state of disgust while consuming the first portion of the media content.

Figure 5A:
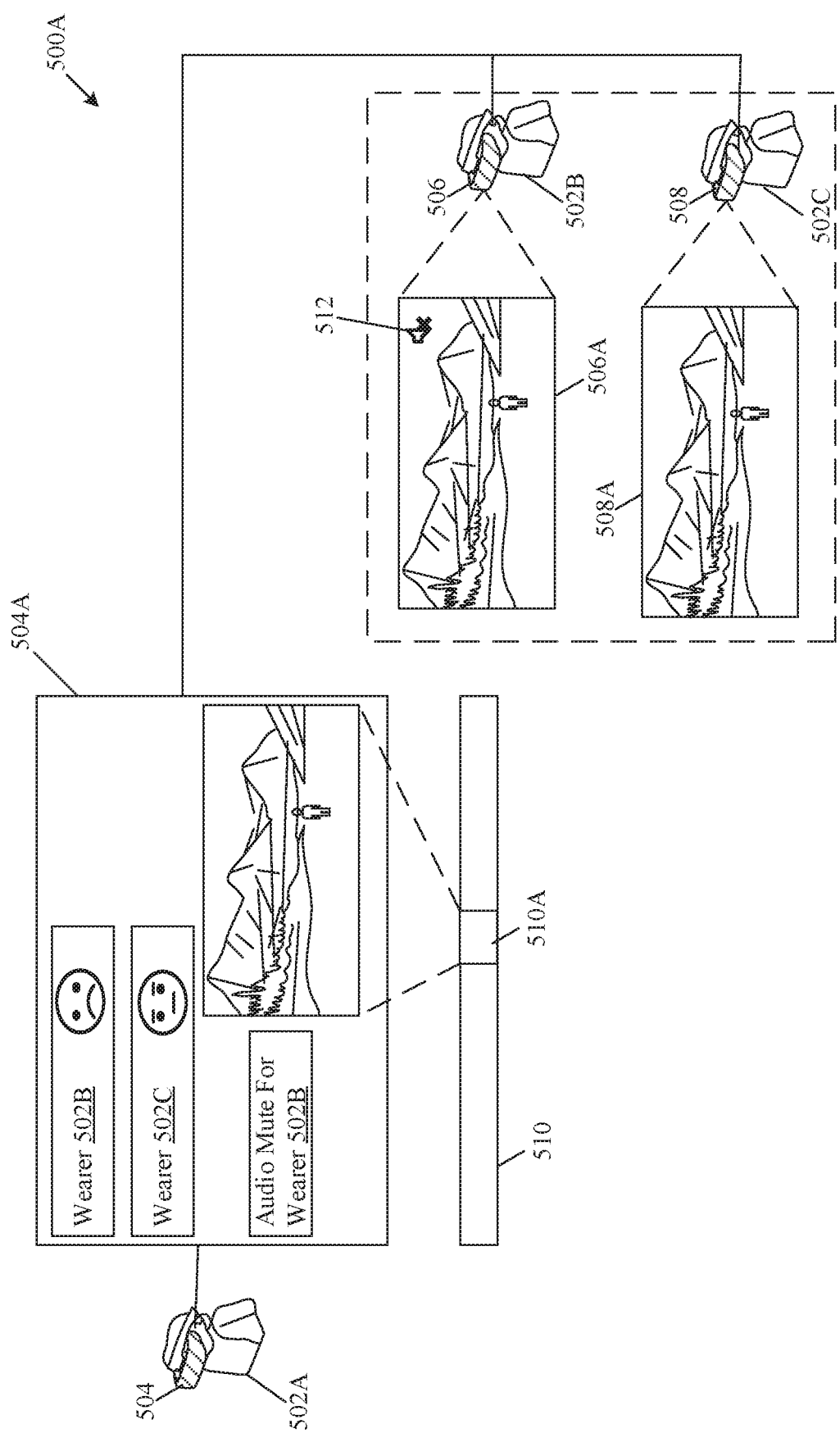
FIG. 5A is a diagram that illustrates an exemplary scenario for a selection of a modification operation from a set of content modification operations, in accordance with an embodiment of the disclosure.

FIG. 5A is a diagram that illustrates an exemplary scenario for a selection of a modification operation from a set of content modification operations, in accordance with an embodiment of the disclosure. FIG. 5A is explained in conjunction with elements from FIG. 1, FIG. 2, FIG. 3, and FIG. 4. With reference to FIG. 5A, there is shown a first scenario 500A. The first scenario 500A may include a first wearer 502A, a second wearer 502B, a third wearer 502C associated with a first HMD device 504, a second HMD device 506, and a third HMD device 508, respectively. There is further shown a playback timeline 510 for the rendered media content and a first portion 510A of the rendered media content for which the emotional state information may be determined. Shown as an example, the first portion 510A of the rendered media content may correspond to a road scene which includes several foreground objects (such as a vehicle and a person) and a background (includes hills).

In an embodiment, the circuitry 202 may select the first HMD device 504 of a plurality of HMD devices 504, 506, and 508 to operate as a master device in a master-slave configuration of the plurality of HMD devices 504, 506, and 506. The selected first HMD device 504 may be different from at least one HMD device (e.g., the second HMD device 506 and the third HMD device 508) which may operate as slave devices in the master-slave configuration. The circuitry 202 may control the selected first HMD device 504 to display the determined emotional state information.

In FIG. 5A, there is shown a view 504A of a display screen of the first HMD device 504 that may render the first portion 510A of the media content and the determined emotional state information associated with the wearers 502B and 502C of the second HMD device 506 and the third HMD device 508, respectively. The determined emotional state information may be displayed on the first HMD device 504 in an equirectangular format along with the rendered media content. As shown in FIG. 5A, the displayed emotional state information associated with the wearers 502B and 502C may include a sad state and a neutral state, respectively.

The circuitry 202 may control the selected first HMD device 504 to display a set of content modification operations associated with the rendered media content. The circuitry 202 may select a first content modification operation from the displayed set of content modification operations based on a user input from the first wearer 502A, via the selected first HMD device 504 (i.e. the master device). For example, the user input may include a selection of a first content modification operation (as depicted by a text "Audio Mute for the wearer 502B" in the view 504A) to mute the playback of audio content in the first portion of the media content. The circuitry 202 may modify the first portion of the rendered media content by application of the first content modification operation on the audio content. In FIG. 5A, there is shown a view 506A of a display screen of the second HMD device 506 which may render the modified media content by muting (as depicted by a mute icon 512 in the view 506A) the playback of the audio content. In FIG. 5A, there is further shown a view 508A of a display screen of the third HMD device 508 that may render the first portion 510A of the media content, without any modification.

Figure 5B:
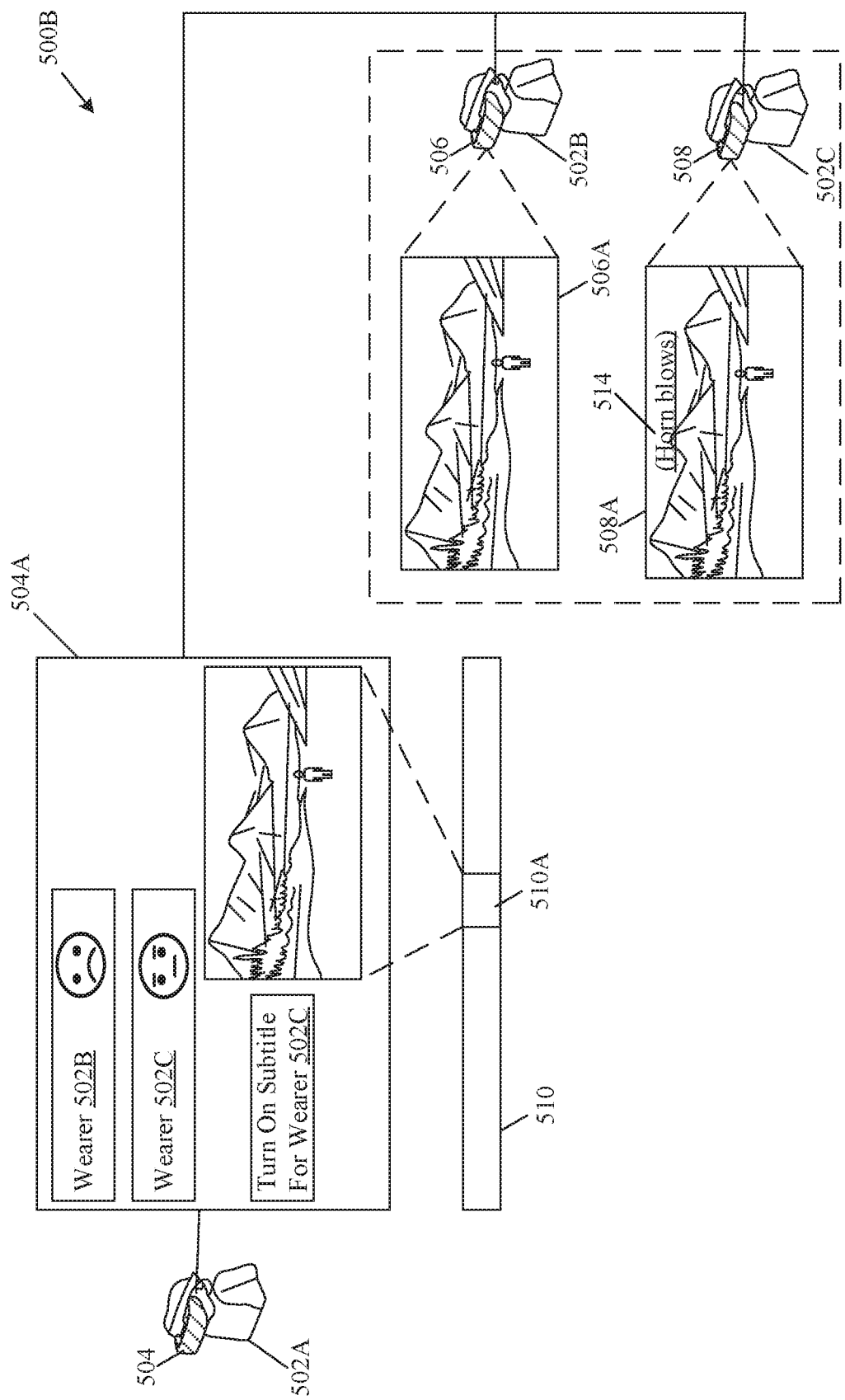
FIG. 5B is a diagram that illustrates another exemplary scenario for a selection of a modification operation from a set of content modification operations, in accordance with an embodiment of the disclosure.

FIG. 5B is a diagram that illustrates another exemplary scenario for a selection of a modification operation from a set of content modification operations, in accordance with an embodiment of the disclosure. FIG. 5B is explained in conjunction with elements from FIG. 1, FIG. 2, FIG. 3, FIG. 4, and FIG. 5A. With reference to FIG. 5B, there is shown a second scenario 500B. The second scenario 500B may include the first wearer 502A, the second wearer 502B, the third wearer 502C associated with the first HMD device 504, the second HMD device 506 and the third HMD device 508, respectively. Each of the first HMD device 504, the second HMD device 506 and the third HMD device 508 may render the first portion 510A of the media content (as described, for example, in FIG. 5A). There is further shown the view 504A of the display screen of the first HMD device 504 (i.e., a master device in a master-slave configuration), and the views 506A and 508A of the display screens of the second HMD device 506 and the third HMD device 508, respectively (i.e., slave devices in the master-slave configuration).

In FIG. 5B, there is further shown the playback timeline 510 for the rendered media content and the first portion 510A of the rendered media content for which the emotional state information may be determined. The view 504A of the display screen of the first HMD device 504 shows the first portion 510A of the rendered media content and the determined emotional state information associated with the wearers 502B and 502C of the second HMD device 506 and the third HMD device 508, respectively. As shown in FIG. 5B, the displayed emotional state information associated with the wearers 502B and 502C may include a sad state and a neutral state, respectively.

The circuitry 202 may control the selected first HMD device 504 to display a set of content modification operations associated with the rendered media content. The circuitry 202 may select a first content modification operation from the displayed set of content modification operations based on a user input from the first wearer 502A, via the selected first HMD device 504. For example, the user input may indicate a selection of a content modification operation (as depicted by a text "Turn on Subtitle for wearer 502C" in the view 504A). The content modification operation may correspond to an enablement of a subtitle text in the first portion 510A of the media content, which may be rendered on the third HMD device 508. The circuitry 202 may modify the first portion 510A of the media content based on the content modification operation. The view 508A of the display screen of the third HMD device 508 shows the modified first portion 510A of the media content. As shown, the modified first portion 510A may include a subtitle text 514 (as depicted by a subtitle text "Horn Blows") in the view 508A. The view 506A of the display screen of the second HMD device 506 shows the first portion 510A of the rendered media content, without any modification.

Figure 5C:
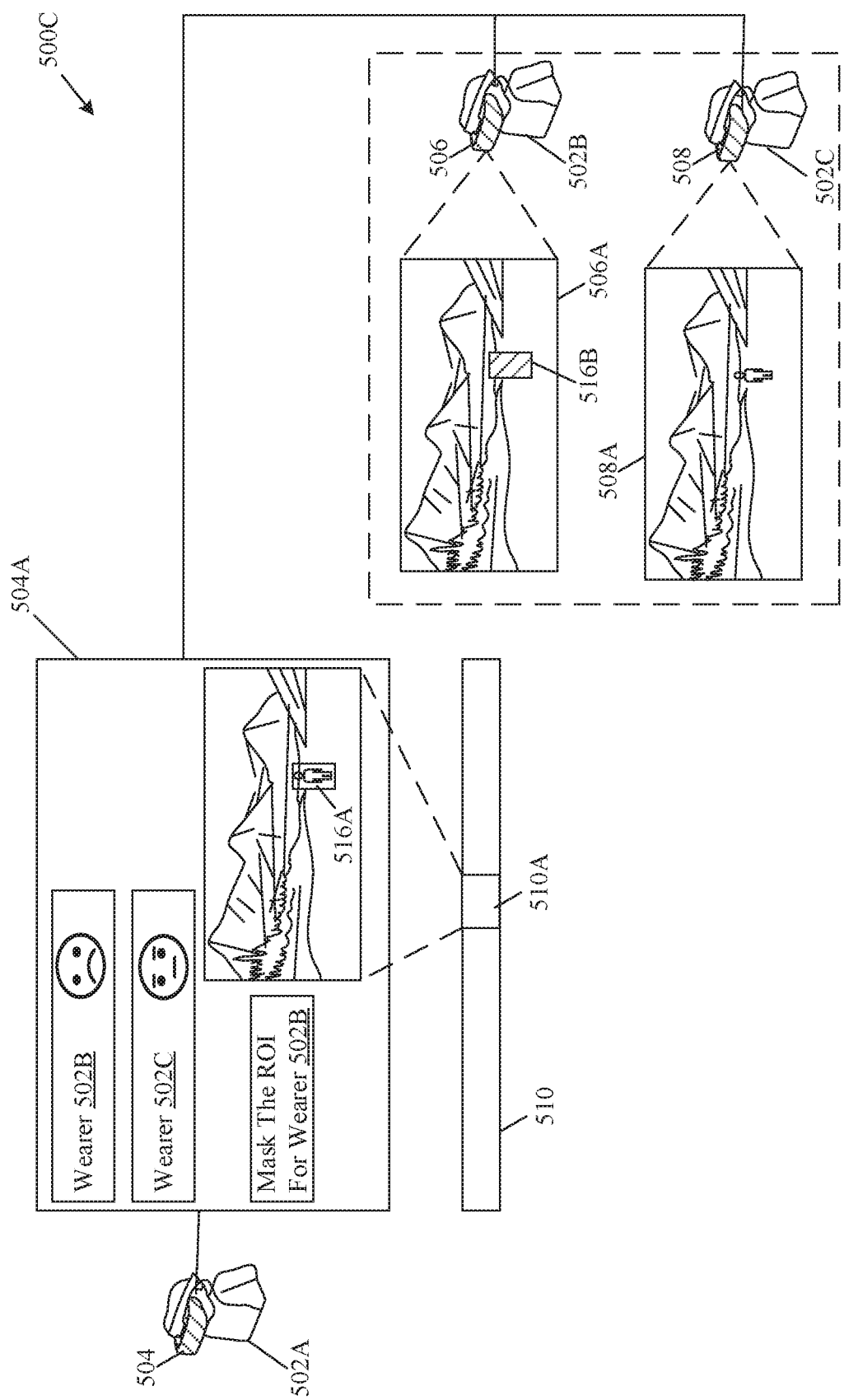
FIG. 5C is a diagram that illustrates another exemplary scenario for a selection of a modification operation from a set of content modification operations, in accordance with an embodiment of the disclosure.

FIG. 5C is a diagram that illustrates another exemplary scenario for a selection of a modification operation from a set of content modification operations, in accordance with an embodiment of the disclosure. FIG. 5C is explained in conjunction with elements from FIG. 1, FIG. 2, FIG. 3, FIG. 4, FIG. 5A, and FIG. 5B. With reference to FIG. 5C, there is shown a third scenario 500C. The third scenario 500C may include the first wearer 502A, the second wearer 502B, the third wearer 502C associated with the first HMD device 504, the second HMD device 506 and the third HMD device 508, respectively. Each of the first HMD device 504, the second HMD device 506 and the third HMD device 508 may render the first portion 510A of the media content (as described, for example, in FIG. 5A). There is further shown, the view 504A of the display screen of the first HMD device 504 (i.e., a master device in a master-slave configuration), and the views 506A and 508A of the display screens of the second HMD device 506 and the third HMD device 508, respectively (i.e., slave devices in the master-slave configuration). There is further shown the playback timeline 510 for the rendered media content and the first portion 510A of the rendered media content for which the emotional state information may be determined.

The view 504A of the display screen of the first HMD device 504 shows the first portion 510A of the rendered media content and the determined emotional state information associated with the wearers 502B and 502C of the second HMD device 506 and the third HMD device 508, respectively. As shown in FIG. 5C, the displayed emotional state information associated with the wearers 502B and 502C may include a sad state and a neutral state, respectively.

The circuitry 202 may control the selected first HMD device 504 to display a set of content modification operations associated with the rendered media content. The circuitry 202 may select a first content modification operation from the displayed set of content modification operations based on a user input from the first wearer 502A, via the selected first HMD device 504 (i.e. a master device). For example, the user input may include a selection of a first content modification operation (as depicted by a text "Mask the ROI for wearer 502B" in the view 504A). The circuitry 202 may apply the first content modification operation to mask a region of interest (ROI) (i.e., an ROI 516A) in the first portion 510A of the media content. The ROI may be masked to obtain the modified first portion 510A of the media content for the second wearer 502B associated with the second HMD device 506. The view 506A of the display screen of the second HMD device 506 shows the modified first portion 510A of the rendered media content, where the ROI appears to be masked (as depicted by the masked ROI 516B in the view 506A). The view 508A of the display screen of the third HMD device 508 shows the first portion 510A of the rendered media content, without any modification.

As an alternative to the master-slave configuration, the plurality of HMD devices 504, 506, and 508 may operate in an automatic mode, where a content modification operation may be applied without a user input. In such a mode, each of the plurality of HMD device 504, 506, and 508 may render the first portion 510A of the media content on a respective display screen in a computer-simulated environment. The circuitry 202 may determine the emotional state information associated with a wearer (e.g., the first wearer 502A, the second wearer 502B, and the third wearer 502C) of each of the plurality of HMD devices 504, 506, and 508.

The circuitry 202 may be configured to determine a region of interest (ROI) in the first portion 510A of the rendered media content based on the determined emotional state information. The emotional state information may include a time series of emotional states of each wearer while consuming the first portion 510A of the rendered media content. The circuitry 202 may track a change of emotional states of each wearer throughout the playback duration of the first portion 510A. Further, the circuitry 202 may apply an object detection technique on each frame in the first portion 510A to detect one or more objects and monitor a movement of such objects in the successive frames of the first portion 510A. From such objects, the circuitry 202 may determine an object as part of an ROI, which may have caused a substantial change in the emotional state of a wearer. As shown, for example, the ROI may include the person present in a scene. In an embodiment, the circuitry 202 may determine a position of an eye gaze of the first wearer 502A of the first HMD device 504. The ROI may be determined further based on the determined position, as described, for example, in FIG. 6. The circuitry 202 may label the first portion 510A of the rendered media content with the determined ROI. The labelled first portion 510A of the rendered media content may be assigned a unique ID for the determined ROI.

The circuitry 202 may extract an audio track associated with the first portion 510A of the rendered media content. Thereafter, the circuitry 202 may construct an input feature based on the labelled first portion 510A of the rendered media content, the determined emotional state information, and the extracted audio track. The circuitry 202 may select the first content modification operation based on application of the first neural network 106 to the constructed input feature (as described in FIG. 10, for example). The circuitry 202 may be configured to select, from the set of content modification operations associated with the rendered media content, the first content modification operation based on application of the first neural network 106 on the constructed input feature, as descried in FIG. 3.

For example, the first content modification operation may include an application of a masking or blurring operation on the determined ROI (e.g., the ROI 516B) in successive frames of the first portion 510A. The circuitry 202 may apply a mask or blur on the determined ROI 516B in the first portion 510A of the rendered media content. For example, the mask may be applied by setting all pixels of the selected portion as '126' or other suitable value between 0 and 255. Alternatively, a blur may be applied on all the pixels in the determined ROI 516B, present in at least one image frame of the first portion 510A. When the determined ROI 516B is absent or moves out of view in any image frame, the masked or blurred pixels may be unmasked or unblurred, respectively.

The circuitry 202 may modify the rendered media content based on the selected first content modification operation (e.g., the masking/blurring of the determined ROI 516B). The modified media content may be rendered on at least one HMD device of the plurality of HMD devices 504, 506, or 508. For example, as shown in FIG. 5C, the determined ROI 516B in the first portion 510A may be masked in the view 506A of the second HMD device 506 of the second wearer 502B, while the views 504A and 508A of the first HMD device 504 and the third HMD device 508, respectively, may continue to show the unmodified media content.

The first scenario 500A, the second scenario 500B, and the third scenario 500C depicted and described in FIG. 5A, FIG. 5B, and FIG. 5C, respectively, are merely provided as examples to illustrate application of exemplary content modification operations on media content. Such examples should not be construed as limiting for the scope of the disclosure.

Figure 6:
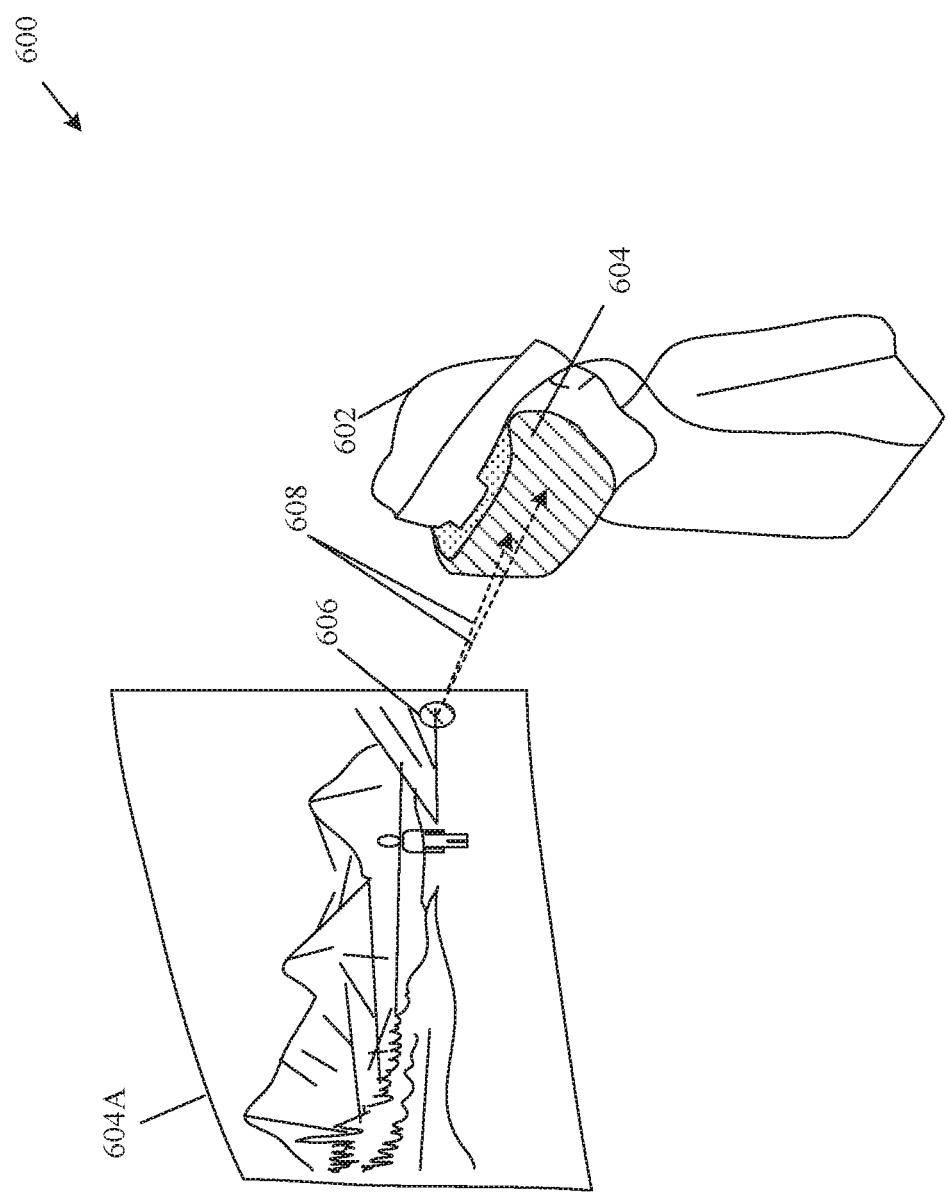
FIG. 6 is a diagram that illustrates an exemplary scenario for determination of position of an eye gaze of a wearer of an HMD device, in accordance with an embodiment of the disclosure.

FIG. 6 is a diagram that illustrates an exemplary scenario for determination of position of an eye gaze of a wearer of an HMD device, in accordance with an embodiment of the disclosure. FIG. 6 is explained in conjunction with elements from FIGS. 1, 2, 3, 4, 5A, 5B and 5C. With reference to FIG. 6, there is shown a scenario 600. The scenario 600 include a first wearer 602, a first HMD device 604 that may be worn by the first wearer 602, a scene 604A (i.e. a portion of media content) that may be rendered on a display screen of the first HMD device 604, and a region of interest (ROI) 606 in the scene 604A.

In an embodiment, the circuitry 202 may be configured to determine a position of an eye gaze 608 of the first wearer 602. The region of interest (ROI) 606 in the scene 604A (which may be a part of a portion of the media content) may be determined based on the determined position of the eye gaze 608. At a particular time-instant, the position of the eye gaze 608 may refer to a location or a region in the scene 604A, where the first wearer 602 may be looking or staring at.

In case of a master-slave configuration, the master device (e.g., the first HMD device 604) may have information associated with a viewing angle of a wearer of each HMD device in the master-slave configuration. The circuitry 202 may be configured to modify the rendered media content based on the viewing angle of each wearer. The scenario 600 depicted and described in FIG. 6 is merely provided as an example and should not be construed as limiting for the scope of the disclosure.

Figure 7A:
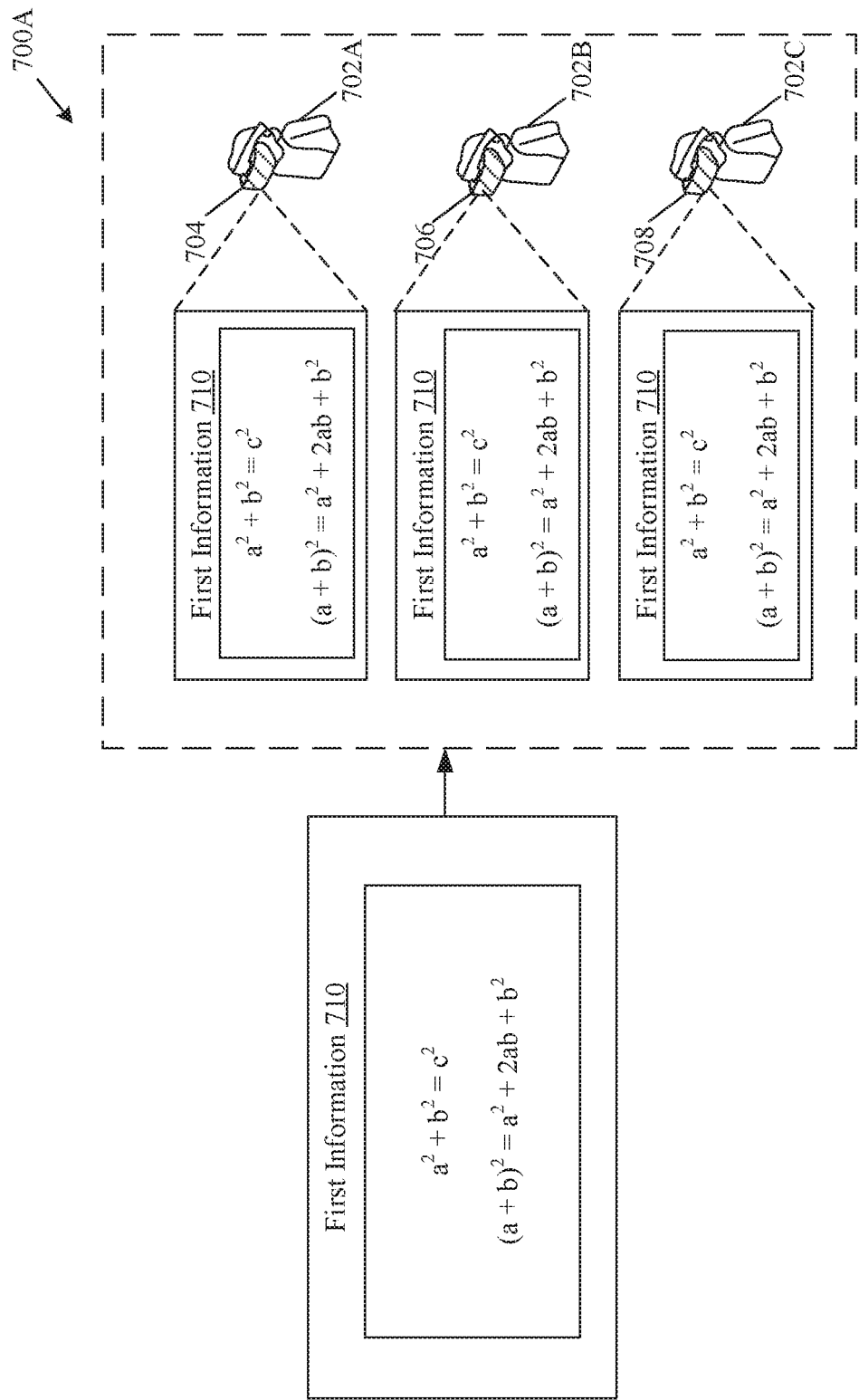
FIGS. 7A and 7B are diagrams that illustrate an exemplary scenario for modification of information included in a first portion of media content, in accordance with an embodiment of the disclosure.
Figure 7B:
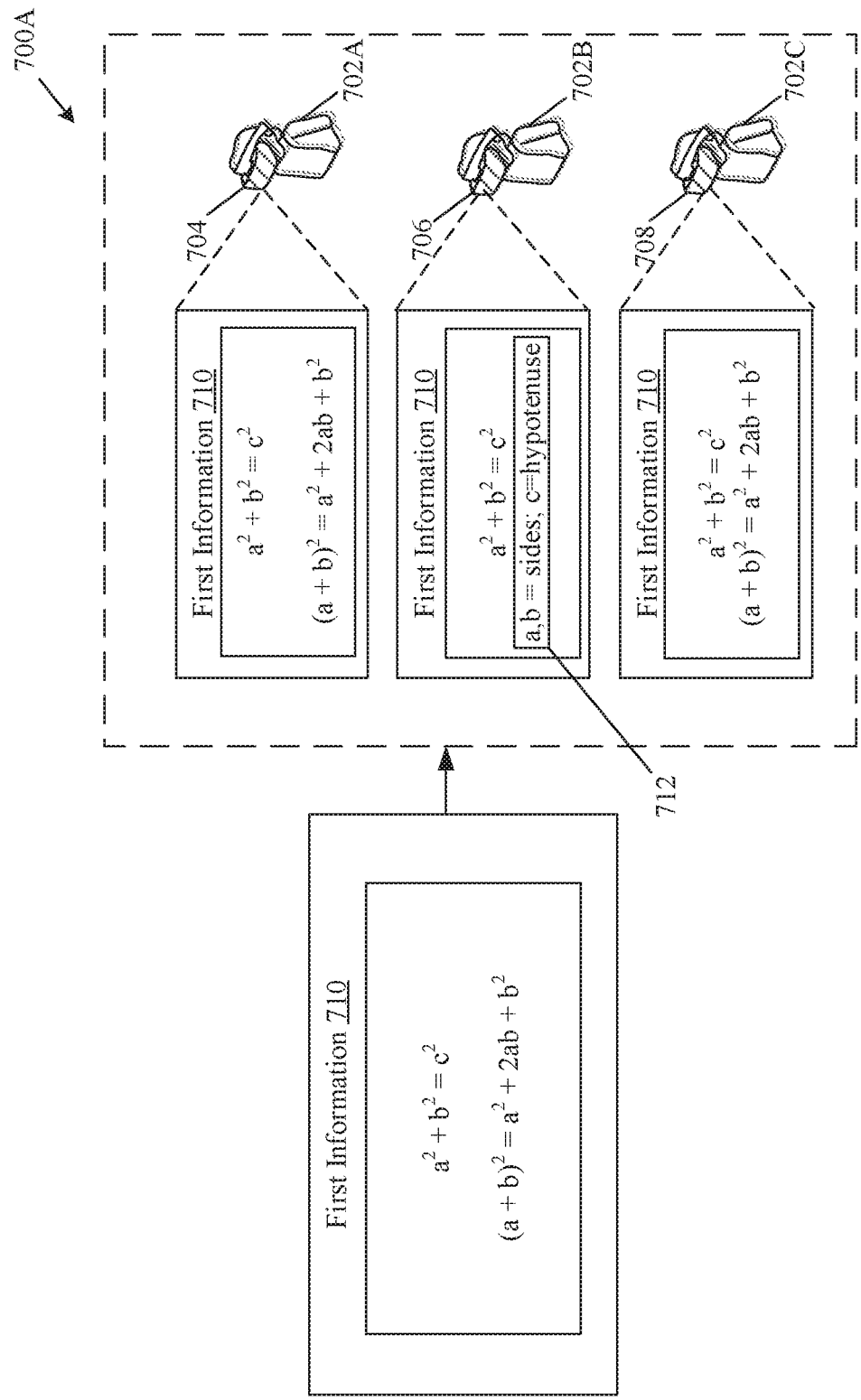

FIGS. 7A and 7B are diagrams that illustrate an exemplary scenario for modification of information included in a first portion of media content, in accordance with an embodiment of the disclosure. FIGS. 7A and 7B are explained in conjunction with elements from FIGS. 1, 2, 3, 4, 5A, 5B, 5C, and 6. With reference to FIGS. 7A and 7B, there is shown a scenario 700A. The scenario 700A may include a first wearer 702A, a second wearer 702B, and a third wearer 702C associated with a first HMD device 704, a second HMD device 706, and a third HMD device 708, respectively. There is further shown first information 710 for the rendered media content and a first portion of the rendered media content for which the emotional state information may be determined.

The circuitry 202 may be configured to determine a first level of detail associated with first information 710 included in the first portion of the rendered media content. As shown, the rendered media content may be a tutoring video that may include a first level of detail (e.g., in terms of number of formulas or explanation of formulas) associated with the first information 710, such as formulas (for example, "$a^2+b^2=c^2$" and "$(a+b)^2=a^2+2ab+b^2$"). The first information 710 may be a part of the first portion of the media content which may be rendered on each of the plurality of HMD devices 704, 706, and 708.

In an embodiment, the circuitry 202 may be configured to select second information 712 to be included with or removed from the first information 710 in the first portion of the media content based on the selected first content modification operation (as described in FIG. 3, for example). As an example, the determined emotional state information for the second wearer 702B may correspond to a nervous state. The nervous state may indicate that the second wearer 702B may be facing some difficulty in understanding the first information 710 (such as a second algebraic formula, "$(a+b)^2=a^2+2ab+b^2$"). In such a case, the circuitry 202 may be configured to select the second information 712 (such as additional details, for example, "a, b=sides; c=hypotenuse") to be included with the first information 710 based on the selected content modification operation. The selected second information 712 may be associated with a second level of detail which may be different from the determined first level of detail. The rendered media content may be modified based on the selection and may be rendered on at least one HMD device (e.g., the second HMD device 706) of the plurality of HMD devices 704, 706, and 708. Thus, details may be added to or deleted from the first information 710 to be displayed on individual HMD devices of different wearers based on emotional states of the respective individual wearers. As two or more wearers may not have same understanding of a tutoring topic (such as algebra), the addition or removal of details to or from the first information 710 may allow each individual wearer to consume the tutoring video with a level of detail which matches a level of understanding of the individual wearer on the topic of the tutoring video.

Figure 7C:
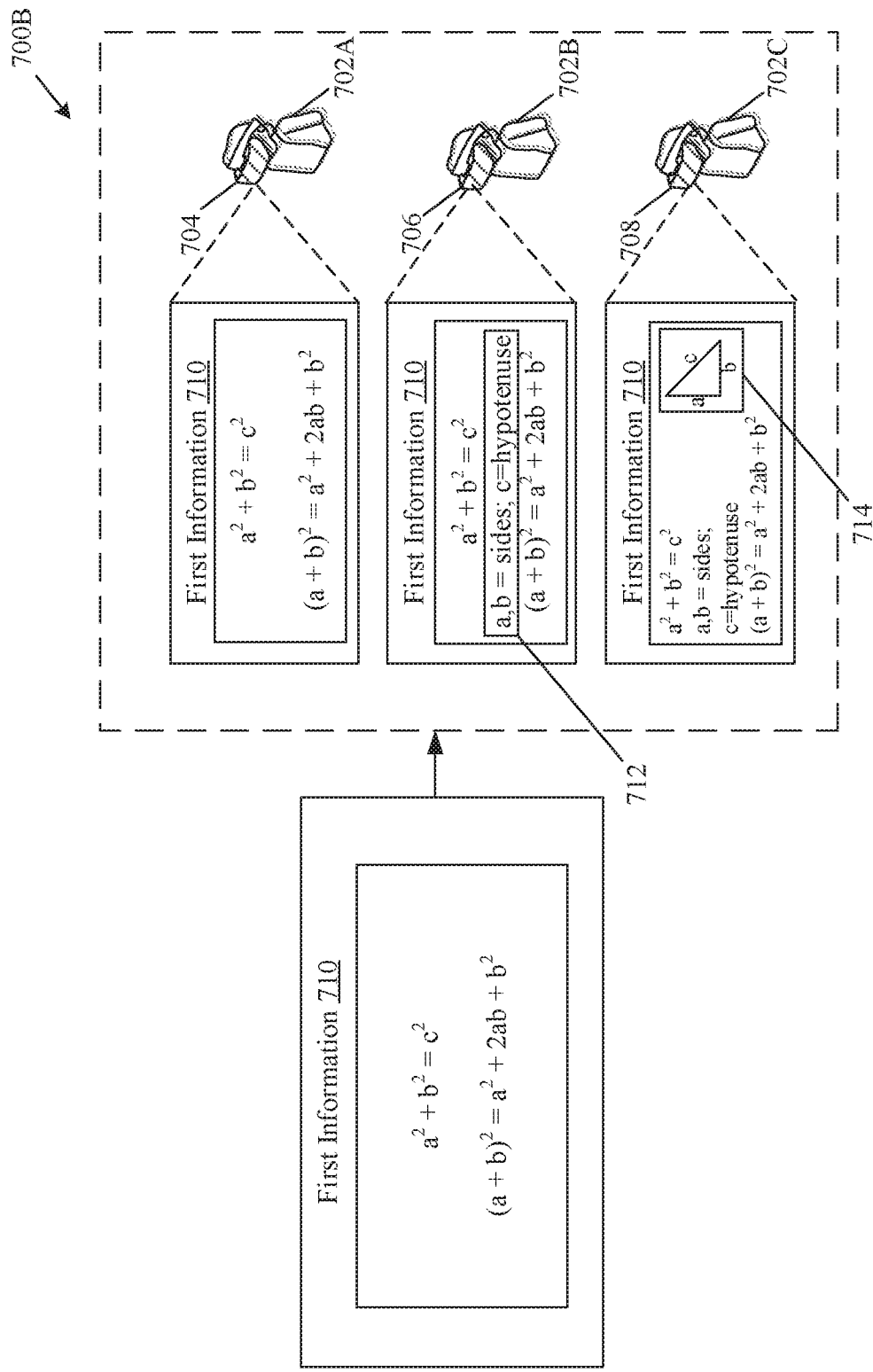
FIG. 7C is a diagram that illustrates an exemplary scenario for modification of information included in a first portion of rendered media content, in accordance with an embodiment of the disclosure.

FIG. 7C is a diagram that illustrates an exemplary scenario for modification of information included in a first portion of media content, in accordance with an embodiment of the disclosure. FIG. 7C is explained in conjunction with elements from FIGS. 1, 2, 3, 4, 5A, 5B, 5C, 6, 7A, and 7B.

With reference to FIG. 7C, there is shown a scenario 700B. The scenario 700B may include the first wearer 702A, the second wearer 702B, and the third wearer 702C associated with the first HMD device 704, the second HMD device 706, and the third HMD device 708, respectively (as shown in FIG. 7A).

The circuitry 202 may determine a set of options to include the second information 712 with the first information 710 included in the first portion of the rendered media content. Such options may be determined based on selection of a first content modification operation for the first portion of the media content. The first information 710 may be associated with a first level of detail which may be different from a second level of detail associated with the second information 712. The level of detail may be defined by amount of information which may be included in the first portion of the media content to explain/describe a topic or a sub-topic in the first portion of the media content.

The set of options may include different information to be included with the first information 710. In an embodiment, the circuitry 202 may store the second information 712 in the memory 204. The inclusion or removal of the second information 712 to or from the first portion may be based on the determined emotional state information associated with the wearers 702A, 702B, and 702C.

The circuitry 202 may be configured to control each HMD device of the plurality of HMD devices 704, 706, and 708 to display a first context menu which includes the determined set of options. In an embodiment, the circuitry 202 may be further configured to receive, via the first HMD device 704, a selection of a first option of the set of options. For example, as shown in FIG. 7C, a user input from the first wearer 702A may include a selection of the first information 710 associated with a first level of detail. Further, a user input from the second wearer 702B may indicate a selection of the second information 712, such as "a, b=sides; c=hypotenuse" to be included with the first information 710. In addition, a user input from the third wearer 702C may indicate a selection of third information 714, such as a diagram of a right-angled triangle with sides of lengths 'a' and 'b', and hypotenuse of a length 'c' to be included with the first information 710. As shown in FIG. 7C, the rendered media content may be modified for display on each of the respective HMD devices 704, 706, and 708 based on the received selection of the first option from each of the wearers 702A, 702B, and 702C.

In certain scenarios, the circuitry 202 may monitor an emotional state of a wearer for whom the media content may be modified on the respective HMD device. The emotional state may be monitored to determine a second emotional state of the wearer. The circuitry 202 may compare the second emotional state with the set of normative emotional states to determine whether the second emotional state corresponds to one of the set of normative emotional states. If it is determined that the second emotional state is different from the set of normative emotional state, the circuitry 202 may determine a second content modification operation based on the second emotional state. The second content modification operation may be determined in a manner similar to the determination of the first content modification operation, as described, for example, at 310 of FIG. 3. The media content may be modified based on the second content modification operation for the wearer and the modified media content may be rendered on the HMD device of the wearer.

The electronic device 102 may enable each wearer to select a level of detail of information to be displayed on their respective HMD device based on their choice. Thus, electronic device 102 may provide a manual customization option to the wearers of the HMD devices through the first context menu including a set of options. The set of options may be determined by the electronic device 102 based on the selected content modification operation, which may in-turn be determined based on the emotion states of the wearers for the first portion of the media content. Individual wearers may be provided with an opportunity for customization of information from automatically curated information that may be displayed on the respective HMD device, based on selection of a level of detail suitable for their level of understanding of a topic. This may further enhance the understanding of the wearers and may help them to effectively consume the media content in a shared session among the plurality of HMD devices 704, 706, and 708.

The scenarios 700A and 700B in FIGS. 7A-7B and FIG. 7C, respectively, are merely provided as examples to illustrate application of exemplary content modification operations on media content. Such examples should not be construed as limiting for the scope of the disclosure.

FIG. 8 is a diagram that illustrates exemplary scenario for inclusion of additional information in a first portion of rendered media content, in accordance with an embodiment of the disclosure. FIG. 8 is explained in conjunction with elements from FIGS. 1, 2, 3, 4, 5A, 5B, 5C, 6, 7A, 7B, and 7C. With reference to FIG. 8, there is shown a scenario 800. The scenario 800 may include a first wearer 802A and a second wearer 802B, who may be associated with a first HMD device 804 and a second HMD device 806, respectively. There is further shown first information 808 (such as algebra formulas "$a^2+b^2=c^2$" and "$(a+b)^2=a^2+2ab+b^2$") in the rendered media content. The first information 808 may be included in a first portion of the rendered media content for which the emotional state information may be determined.

The circuitry 202 may collect third information 810, which may be included in a user input over the first information 808 in the first portion of the rendered media content. Such information may be collected via a first HMD device (e.g., the first HMD device 804) of the plurality of HMD devices 804 and 806. For example, the user input may include a highlighting action over a text portion in the first information 808, a selection of a text portion in the first information 808, or a pen marking over certain text or image in the first information 808. As an example, the media content may be rendered in a shared tutoring session on the plurality of HMD devices 804 and 806. At any time-instant, the first wearer 802A may have query associated with the first information 808 in the first portion of the rendered media content. The circuitry 202 may receive, in the user input, the third information 810 (such as, a query "What is c?"). The third information 810 may be included with the first information 808 as one or more of textual information, a graphical UI element (such as a question mark), a drawing, or digital pen markings.

The circuitry 202 may modify the rendered media content based on addition of the collected third information 810 to the first information 808. Further, the modified media content may be rendered on at least one HMD device of the plurality of HMD devices 804 and 806. For example, the modified media content may be rendered on both the first HMD device 804 and the second HMD device 806. With the addition of the collected third information 810 to the first information 808, the disclosed electronic device 102 may enable a level of interactivity in the shared tutoring session between multiple participants (i.e., wearers of the HMD devices) may help in improving a learning experience of the participants. The scenario 800 in FIG. 8 is merely provided as an example of a modification of media content and should not be construed as limiting for the disclosure. For example, other than tutoring content, the scenario 800 may be applicable to different types of media content. Operations of the circuitry 202 for such types of content are omitted from the disclosure for the sake of brevity.

Figure 9:
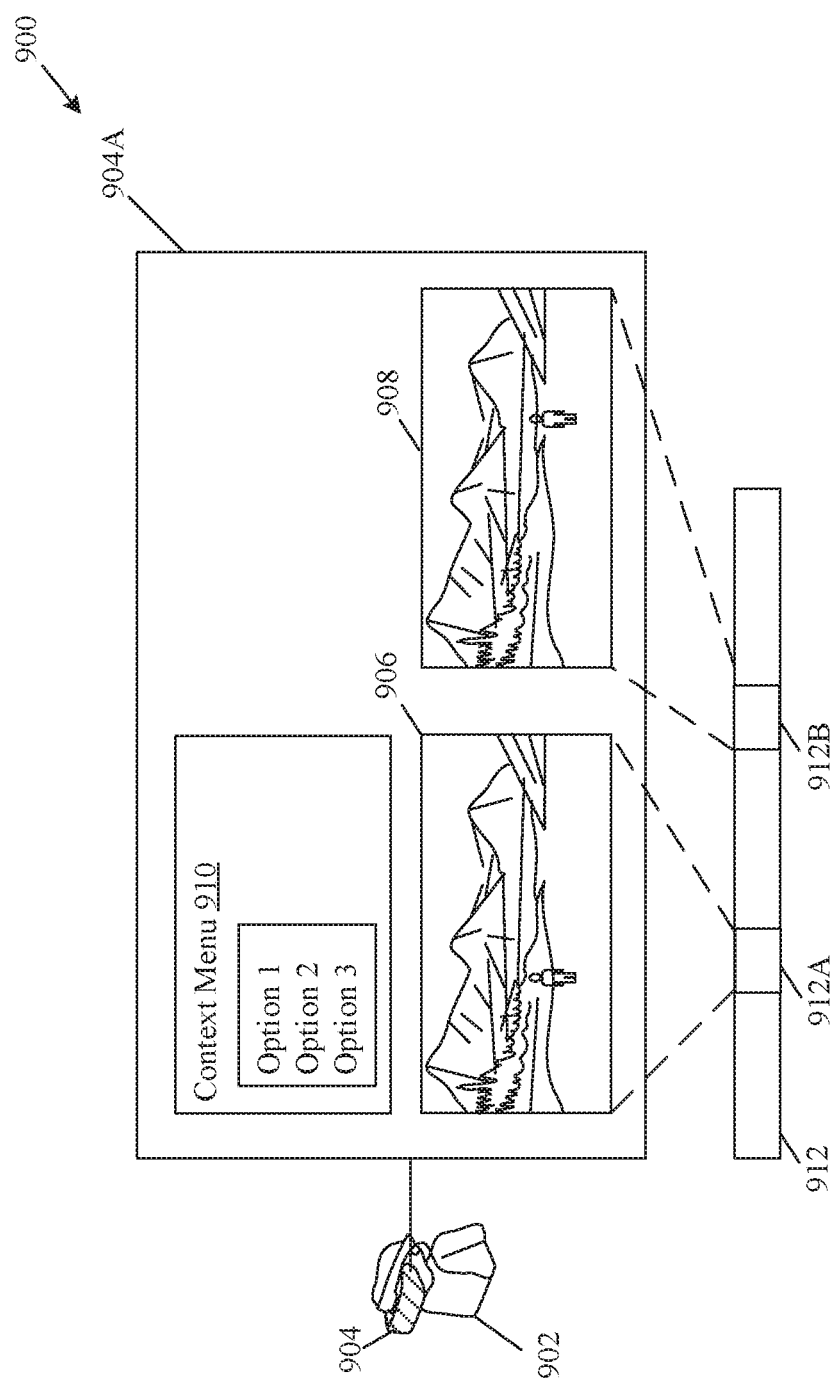
FIG. 9 is a diagram that illustrates exemplary scenario for a set of content navigation options associated with rendered media content, in accordance with an embodiment of the disclosure.

FIG. 9 is a diagram that illustrates exemplary scenario for a set of content navigation options associated with rendered media content, in accordance with an embodiment of the disclosure. FIG. 9 is explained in conjunction with elements from FIGS. 1, 2, 3, 4, 5A, 5B, 5C, 6, 7A, 7B, 7C, and 8. With reference to FIG. 9, there is shown a scenario 900. The scenario 900 may include a first wearer 902 and a first HMD device 904 associated with the first wearer 902. There is further shown a view 904A of a display screen of the first HMD device 904. There is further shown a first portion 906 of the rendered media content for which the emotional state information may be determined. Further, there is shown a second portion 908 of the rendered media content. FIG. 9 depicts a second context menu (e.g., a second context menu 910) including content navigation options, such as, "Option 1", "Option 2", and "Option 3". In FIG. 9, there is further shown a playback timeline 912 of the rendered media content. The playback timeline 912 may include a first time period 912A that may be associated with the first portion 906 of the rendered media content and a second time period 912B that may be associated with the second portion 908 of the rendered media content.

The circuitry 202 may determine, based on the selected first content modification operation, a set of content navigation options associated with the rendered media content. Each content navigation option of the determined set of content navigation options may correspond to the second portion 908 of the media content. The second portion 908 may correspond to a portion of the media content which may yet to be rendered and may be different from the first portion 906. The circuitry 202 may control each HMD device (such as the first HMD device 904) of the plurality of HMD devices 104 to display the second context menu 910 including the determined set of content navigation options (such as, "Option 1", "Option 2", and "Option 3"). The circuitry 202 may receive, via the first HMD device 904, a selection of a first content navigation option (e.g., "Option 1") of the displayed set of content navigation options. The first HMD device 904 may switch from the first portion 906 of the media content to render the second portion 908 of the media content based on the received selection. The second context menu 910 may enable content navigation through the rendered media content for each wearer of respective HMD devices. Each wearer may navigate to a certain portion and view the portion of the media content, irrespective of which portion is rendered on the HMD devices of the other wearers. Instead of a traditional linear content delivery, this may allow the wearer to consume the media content in a non-linear fashion, through a respective HMD device.

The scenario 900 of FIG. 9 is merely provided as an example of content navigation in a shared session and should not be construed as limiting for the scope of the disclosure. The second portion 908 may not necessarily succeed the first portion 906 in the rendered media content, as depicted in FIG. 9. In some embodiments, the second portion 908 may be precede the first portion 906 in the rendered media content.

Some additional scenarios are described herein. In an embodiment, the circuitry 202 may control an HMD device (such as the first HMD device 904) of the plurality of HMD devices 104 to display an option to leave a shared session, in which the media content may be rendered on each of the plurality of HMD devices 104. For example, if the emotional state of a wearer of the first HMD device 904 indicates that the wearer is uncomfortable at any time-instant in consuming a specific portion of the media content, then an option may be displayed to allow the wearer to leave the shared session. Based on the selection, the circuitry 202 may control the HMD device (such as the first HMD device 904) to exit the shared session and pause/stop the playback of the media content. In case the wearer wants to rejoin the same session at another time-instant, the circuitry 202 may control the HMD device (such as the first HMD device 904) to rejoin the shared session. The wearer may be able to consume same portion of the media content which all other wearers of HMD devices may be consuming in the same session. In these or other embodiments, the circuitry 202 may monitor emotional states of each wearer to decide actions, such as to pause a playback of the media content or to resume the paused playback of the media content.

Figure 10:
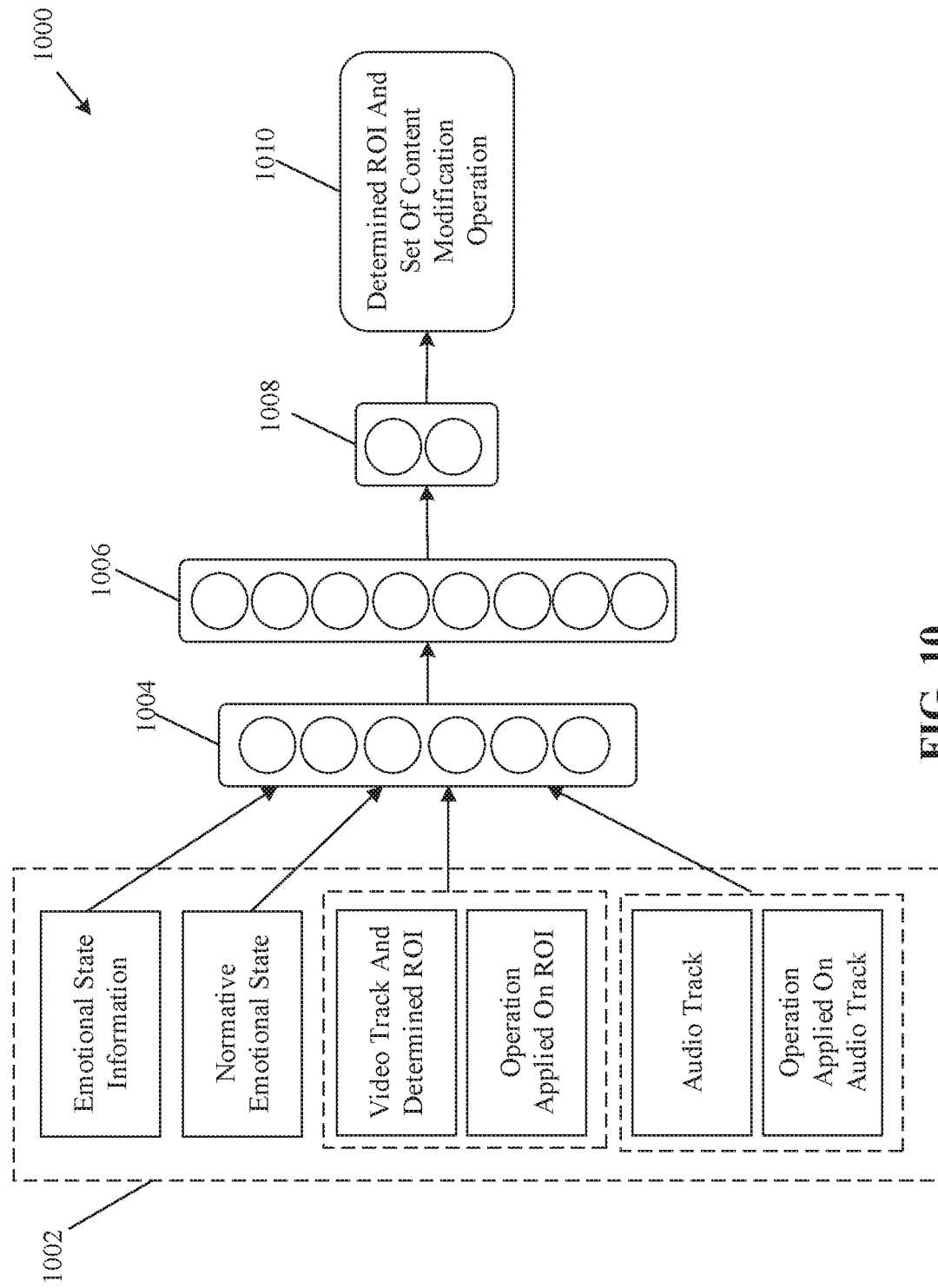
FIG. 10 is a diagram that illustrates exemplary scenario for a training of a neural network, in accordance with an embodiment.

FIG. 10 is a diagram that illustrates exemplary scenario for a training of a neural network, in accordance with an embodiment. FIG. 10 is explained in conjunction with elements from FIGS. 1, 2, 3, 4, 5A, 5B, 5C, 6, 7A, 7B, 7C, 8, and 9. With reference to FIG. 10, there is shown a scenario 1000. The scenario 1000 may include input features 1002, an input layer 1004, a hidden layer 1006, and an output layer 1008.

The first neural network 106 may receive the input features 1002 through the input layer 1004 of the first neural network 106. The input features 1002 may include the determined emotional state information, a normative emotional state, a video track, and an audio track. In some embodiments, the determined emotional state information may include the first emotional state that may be different from a set of normative emotional states for the first portion of the rendered media content, as described for example, in FIG. 3. In a training phase, the circuitry 202 may train the first neural network 106 by use of training data that may include different combinations of training video content with pre-determined regions of interests (ROIs) and a tagged set of corresponding operations that may be applicable on the ROI for different emotional states (i.e., emotional state information). The training data may further include different combinations of training audio tracks and a tagged set of corresponding operations that may be applicable on the audio tracks for different emotional states (i.e., emotional state information). In an embodiment the first neural network 106 may be trained to label an accurate level of information based on the normative emotional state. Through the output layer 1008 of the first neural network 106, the first neural network 106 may output information 1010, such as the determined ROIs in input video tracks and a set of content modification operations associated with the rendered media content. Examples of such content modification operations may include, but are not limited to, a first modification applicable on an audio playback of the first portion, a second modification applicable on a subtitle or a closed caption data in the first portion, a third modification applicable on a display of the first portion, a masking operation applicable on the determined ROI in the first portion of the rendered media content, or a blur operation applicable on the determined ROI in the first portion of the rendered media content, as described for example, in FIGS., 5A, 5B, and 5C.

In an embodiment, the rendered media content may be an advertisement for a product or a service. The first neural network 106 may be trained based on the emotional state information and the first portion of the rendered media content. As an example, if the emotional state of a wearer of an HMD device is a happy state, the first neural network 106 may determine a set of content modification operations that may be suitable for such state. For example, the happy state may be indicative of the wearer's interest in the product. In such a case, the output of the first neural network 106 may be indicative of an inclusion of additional information, such as social network links associated with the product, similar products, or the organization who markets or sells the product, so that the wearer may try or buy them as well. Further, the modified content may include price information and details associated with an addition to a purchase cart, to encourage the wearer to buy the product.

As another example, if the emotional state of a wearer of an HMD device is a neutral state, the first neural network 106 may determine a set of content modification operations that may be suitable for such neutral state. The neutral state may be indicative of a partial interest of the wearer in the product. In such a case, the output of the first neural network 106 may be indicative of a removal of the certain information from media content rendered on the HMD device. An example, of such removed information may include, but is not limited to, price information or details associated with an addition to a purchase cart. The output of the first neural network 106 may be further indicative of addition of information such as, links to social network sites associated with similar products to display such information on the HMD device of the wearer and encourage the wearer to check out similar products.

As another example, if the emotional state of a wearer of an HMD device is a sad state, the first neural network 106 may determine a set of content modification operations that may be suitable for such state. The sad state may be indicative of a disinterest of the wearer in the product. In such a case, the output of the first neural network 106 may be indicative of a removal of certain information from media content rendered on the HMD device. An example of such removed information may include, but is not limited to, price information or details associated with an addition to a purchase cart. The output of the first neural network 106 may be further indicative of addition of information such as, links to social network sites associated with different products to display such information on the HMD device of the wearer and encourage the wearer to check out different products that might catch interest of the wearer.

Figure 11:
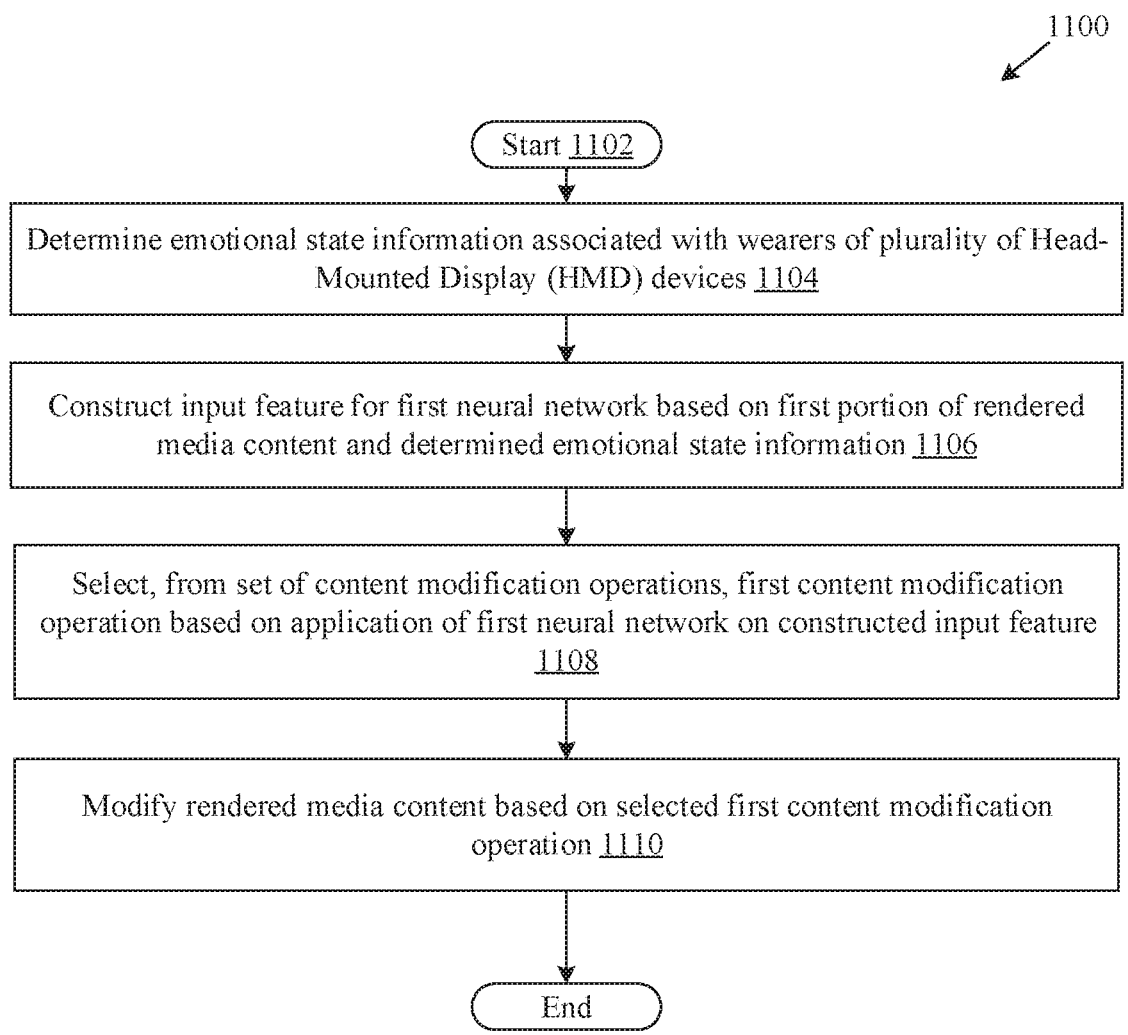
FIG. 11 is a flowchart that illustrates exemplary method for content modification in a shared session among multiple head-mounted display (HMD), in accordance with an embodiment of the disclosure.

FIG. 11 is a flowchart that illustrates exemplary method for content modification in a shared session among multiple head-mounted display (HMD), in accordance with an embodiment of the disclosure. FIG. 11 is explained in conjunction with elements from FIGS. 1, 2, 3, 4, 5A, 5B, 5C, 6, 7A, 7B, 7C, 8, 9, and 10. With reference to FIG. 11, there is shown a flowchart 1100. The method illustrated in the flowchart 1100 may be executed by any computing system, such as by the electronic device 102 or the circuitry 202. The method may start at 1102 and proceed to 1104.

At 1104, emotional state information may be determined. In one or more embodiments, the circuitry 202 may be configured to determine the emotional state information associated with wearers 110A, 110B . . . 110N of the plurality of head-mounted display (HMD) devices 104. Each HMD device of the plurality of HMD devices 104 may render media content in a computer-simulated environment, and the determined emotional state information may correspond to a first portion of the rendered media content. The determination of the emotional state information is explained further, for example, in FIG. 3.

At 1106, an input feature may be constructed. In one or more embodiments, the circuitry 202 may be configured to construct the input feature for the first neural network 106 based on the first portion of the rendered media content and the determined emotional state information. The construction of the input feature is explained further, for example, in FIG. 3.

At 1108, a first content modification operation may be selected. In one or more embodiments, the circuitry 202 may be configured to select, from a set of content modification operations associated with the rendered media content, the first content modification operation based on application of the first neural network 106 on the constructed input feature. The selection of the first content modification operation is explained further, for example, in FIG. 3.

At 1110, the rendered media content may be modified. In one or more embodiments, the circuitry 202 may be configured to modify the rendered media content based on the selected first content modification operation. The modified media content may be rendered on at least one HMD device of the plurality of HMD devices 104. Control may pass to end. The rendering of the modified media content is explained further for example, in FIGS. 5A, 5B, 5C, 7A, 7B, 7C, and 8.

Although the flowchart 1100 is illustrated as discrete operations, such as 1102, 1104, 1106, 1108, and 1110, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (such as, the electronic device 102). The instructions may cause the machine and/or computer to perform operations that include determination of emotional state information associated with a wearer (such as, a wearer from the wearer 110A, 110B . . . 110N) of each of a plurality of head-mounted display (HMD) devices (such as the plurality of HMD devices 104). Each HMD device of the plurality of HMD devices 104 may render media content in a computer-simulated environment, and the determined emotional state information may correspond to a first portion of the rendered media content. The operations may further include construction of an input feature for a first neural network (such as, the first neural network 106) based on the first portion of the rendered media content and the determined emotional state information. The operations may further include selection, from a set of content modification operations associated with the rendered media content, of a first content modification operation based on application of the first neural network 106 on the constructed input feature. The operations may further include modification of the rendered media content based on the selected first content modification operation. The modified media content may be displayed on at least one HMD device of the plurality of HMD devices 104.

Exemplary aspects of the disclosure may provide an electronic device (such as the electronic device 102 of FIG. 1) that may include circuitry (such as the circuitry 202) communicatively coupled to a plurality of head-mounted display (HMD) devices (such as the plurality of HMD devices 104). Each HMD device of the plurality of HMD devices 104 may render media content in a computer-simulated environment. The circuitry 202 may be configured to determine emotional state information associated with a wearer (such as a wearer from the wearers 110A, 110B . . . 110N) of each of the plurality of HMD devices 104. The determined emotional state information may correspond to a first portion of the rendered media content. In accordance with an embodiment, the determined emotional state information may include a time-series of emotional states of the wearer (e.g., the first wearer 110A) of each of the plurality of HMD devices 104. Each emotional state in the time-series of emotional states may include one of: a sad state, a happy state, a neutral state, a surprised state, a fear state, a nervous state, or a disgust state. The circuitry 202 may be configured to construct an input feature for a first neural network (such as the first neural network 106) based on the first portion of the rendered media content and the determined emotional state information. The circuitry 202 may be configured to select, from a set of content modification operations associated with the rendered media content, a first content modification operation based on application of the first neural network 106 on the constructed input feature. The circuitry 202 may be further configured to modify the rendered media content based on the selected first content modification operation. The modified media content may be displayed on at least one HMD device of the plurality of HMD devices 104.

In accordance with an embodiment, the circuitry may be further configured to detect, based on the emotional state information, a first emotional state that may be different from a set of normative emotional states for the first portion of the rendered media content. The first emotional state which may be detected to be associated with the first wearer 110A of a first HMD device (e.g., the first HMD device 104A) of the plurality of HMD devices 104, and the modified media content may be rendered on the first HMD device 104A.

In accordance with an embodiment, the circuitry 202 may be configured to select the first HMD device 104A of the plurality of HMD devices 104 to operate as a master in a master-slave configuration of the plurality of HMD devices 104. The circuitry 202 may be configured to control the selected first HMD device 104A to display the determined emotional state information. The circuitry 202 may be further configured to control the selected first HMD device 104A to display the set of content modification operations. The circuitry 202 may be further configured to select the first content modification operation from the displayed set of content modification operations.

In accordance with an embodiment, the selected first HMD device 104A may be different from at least one HMD device (e.g., the second HMD device 104B) which may operate as slaves in the master-slave configuration.

In accordance with an embodiment, the circuitry 202 may be further configured to determine a region of interest (ROI) in the first portion of the rendered media content based on the determined emotional state information. The circuitry 202 may be further configured to label the first portion of the rendered media content with the determined ROI. The circuitry 202 may be further configured to extract an audio track associated with the first portion of the rendered media content. Based on the labelled first portion of the rendered media content, the determined emotional state information, and the extracted audio track, the circuitry 202 may be configured to construct the input feature.

In accordance with an embodiment, the selected first content modification operation may include one or more of: a first modification applicable on an audio playback of the first portion, a second modification applicable on a subtitle or a closed caption data in the first portion, a third modification applicable on a display of the first portion, a masking operation applicable on the determined ROI in the first portion of the rendered media content, or a blur operation applicable on the determined ROI in the first portion of the rendered media content.

In accordance with an embodiment, circuitry 202 may be further configured to determine a position of an eye gaze (e.g., the eye gaze 608) of a first wearer (e.g., the first wearer 602) of a first HMD device (e.g., the first HMD device 604) of the plurality of HMD devices 104. The ROI (e.g., the ROI 606) may be determined further based on the determined position.

In accordance with an embodiment, the circuitry 202 may be further configured to determine a first level of detail associated with first information included in the first portion of the rendered media content. The circuitry 202 may be further configured to select second information to be included with or removed from the first information in the first portion based on the selected first content modification operation. The selected second information may be associated with a second level of detail different from the determined first level of detail. Further, the rendered media content may be modified based on the selection, and the modified media content may be rendered on the at least one HMD device of the plurality of HMD devices 104.

In accordance with an embodiment, the circuitry 202 may be further configured to determine, based on the selected first content modification operation, a set of options to include second information with first information included in the first portion of the rendered media content. The first information may be associated with a first level of detail which may be different from a second level of detail associated with the second information. The circuitry 202 may be further configured to control each HMD device of the plurality of HMD devices 104 to display a first context menu comprising the determined set of options.

In accordance with an embodiment, the circuitry 202 may be further configured to receive, via a first HMD device (e.g., the first HMD device 104A) of the plurality of HMD devices 104, a selection of a first option of the set of options. The rendered media content may be modified further based on the received selection of the first option.

In accordance with an embodiment, the circuitry 202 may be further configured to collect, via a first HMD device (e.g., the first HMD device 104A) of the plurality of HMD devices 104, third information included in a user input over first information in the first portion of the rendered media content. The circuitry 202 may be further configured to modify the rendered media content based on addition of the collected third information to the first information. The modified media content may be rendered on the at least one HMD device of the plurality of HMD devices 104.

In accordance with an embodiment, the circuitry 202 may be further configured to determine, based on the selected first content modification operation, a set of content navigation options associated with the rendered media content. Each content navigation option of the determined set of content navigation options may correspond to a second portion of the media content which may be yet to be rendered and may be different from the first portion. The circuitry 202 may be further configured to control each HMD device of the plurality of HMD devices 104 to display a second context menu comprising the determined set of content navigation options.

In accordance with an embodiment, the circuitry 202 may be further configured to receive, via a first HMD device (e.g., the first HMD device 104A) of the plurality of HMD devices 104, a selection of a first content navigation option of the displayed set of content navigation options. The second portion of the media content may be rendered on the first HMD device (e.g., the first HMD device 104A) based on the received selection.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic device, comprising:
   circuitry communicatively coupled to a plurality of head-mounted display (HMD) devices, wherein
      each HMD device of the plurality of HMD devices renders media content in a computer-simulated environment, and
      the circuitry is configured to:
         determine emotional state information associated with a wearer of each of the plurality of HMD devices, wherein
            the determined emotional state information corresponds to a first portion of the rendered media content;
         construct an input feature for a first neural network based on the first portion of the rendered media content and the determined emotional state information;
         select, from a set of content modification operations associated with the rendered media content, a first content modification operation based on application of the first neural network on the constructed input feature; and modify the rendered media content based on the selected first content modification operation,
wherein the modified media content is rendered on at least one HMD device of the plurality of HMD devices.

2. The electronic device according to claim 1, wherein
the determined emotional state information comprises a time-series of emotional states of the wearer of each of the plurality of HMD devices, and each emotional state in the time-series of emotional states is one of: a sad state, a happy state, a neutral state, a surprised state, a fear state, a nervous state, or a disgust state.

3. The electronic device according to claim 1, wherein the circuitry is further configured to detect, based on the emotional state information, a first emotional state to be different from a set of normative emotional states for the first portion of the rendered media content, wherein the first emotional state is detected to be associated with a first wearer of a first HMD device of the plurality of HMD devices, and
the modified media content is rendered on the first HMD device.

4. The electronic device according to claim 1, wherein the circuitry is further configured to:

select a first HMD device of the plurality of HMD devices to operate as a master in a master-slave configuration of the plurality of HMD devices;
control the selected first HMD device to display the determined emotional state information;
control the selected first HMD device to display the set of content modification operations associated with the rendered media content; and
select the first content modification operation from the displayed set of content modification operations based on a user input via the selected first HMD device.

5. The electronic device according to claim 4, wherein the selected first HMD device is different from the at least one HMD device which operate as slaves in the master-slave configuration.

6. The electronic device according to claim 1, wherein the circuitry is further configured to:

determine a region of interest (ROI) in the first portion of the rendered media content based on the determined emotional state information;
label the first portion of the rendered media content with the determined ROI;
extract an audio track associated with the first portion of the rendered media content; and
construct the input feature based on the labelled first portion of the rendered media content, the determined emotional state information, and the extracted audio track.

7. The electronic device according to claim 6, wherein the selected first content modification operation comprises one or more of:

a first modification applicable on an audio playback of the first portion,
a second modification applicable on a subtitle or a closed caption data in the first portion,
a third modification applicable on a display of the first portion,
a masking operation applicable on the determined ROI in the first portion of the rendered media content, or a blur operation applicable on the determined ROI in the first portion of the rendered media content.

8. The electronic device according to claim 6, wherein the circuitry is further configured to determine a position of an eye gaze of a first wearer of a first HMD device of the plurality of HMD devices, wherein the ROI is determined further based on the determined position.

9. The electronic device according to claim 1, wherein the circuitry is further configured to:

determine a first level of detail associated with first information included in the first portion of the rendered media content; and
select second information to be included with or removed from the first information in the first portion based on the selected first content modification operation, wherein
the selected second information is associated with a second level of detail different from the determined first level of detail,
the rendered media content is modified based on the selection, and
the modified media content is rendered on the at least one HMD device of the plurality of HMD devices.

10. The electronic device according to claim 1, wherein the circuitry is further configured to:

determine, based on the selected first content modification operation, a set of options to include second information with first information included in the first portion of the rendered media content,
the first information is associated with a first level of detail which is different from a second level of detail associated with the second information; and
control each HMD device of the plurality of HMD devices to display a first context menu comprising the determined set of options.

11. The electronic device according to claim 10, wherein the circuitry is further configured to receive, via a first HMD device of the plurality of HMD devices, a selection of a first option of the set of options,
wherein the rendered media content is modified further based on the received selection of the first option.

12. The electronic device according to claim 1, wherein the circuitry is further configured to:

collect, via a first HMD device of the plurality of HMD devices, third information included in a user input over first information in the first portion of the rendered media content; and
modify the rendered media content based on addition of the collected third information to the first information, wherein
the modified media content is rendered on the at least one HMD device of the plurality of HMD devices.

13. The electronic device according to claim 1, wherein the circuitry is further configured to:

determine, based on the selected first content modification operation, a set of content navigation options associated with the rendered media content,
each content navigation option of the determined set of content navigation options corresponds to a second portion of the media content which is yet to be rendered and is different from the first portion; and
control each HMD device of the plurality of HMD devices to display a second context menu comprising the determined set of content navigation options.

14. The electronic device according to claim 13, wherein the circuitry is further configured to receive, via a first HMD device of the plurality of HMD devices, a selection of a first content navigation option of the displayed set of content navigation options, and
- wherein the second portion of the media content is rendered on the first HMD device based on the received selection.

15. A method, comprising:
- determining emotional state information associated with a wearer of each of a plurality of head-mounted display (HMD) devices, wherein
  - each HMD device of the plurality of HMD devices renders media content in a computer-simulated environment, and
  - the determined emotional state information corresponds to a first portion of the rendered media content;
- constructing an input feature for a first neural network based on the first portion of the rendered media content and the determined emotional state information;
- selecting, from a set of content modification operations associated with the rendered media content, a first content modification operation based on application of the first neural network on the constructed input feature; and
- modifying the rendered media content based on the selected first content modification operation, wherein the modified media content is rendered on at least one HMD device of the plurality of HMD devices.

16. The method according to claim 15, further comprising:
- selecting a first HMD device of the plurality of HMD devices to operate as a master in a master-slave configuration of the plurality of HMD devices;
- controlling the selected first HMD device to display the determined emotional state information;
- controlling the selected first HMD device to display the set of content modification operations associated with the rendered media content; and
- selecting the first content modification operation from the displayed set of content modification operations based on a user input via the selected first HMD device.

17. The method according to claim 16, wherein the selected first HMD device is different from the at least one HMD device which operate as slaves in the master-slave configuration.

18. The method according to claim 15, further comprising:
- determining a region of interest (ROI) in the first portion of the rendered media content based on the determined emotional state information;
- labelling the first portion of the rendered media content with the determined ROI;
- extracting an audio track associated with the first portion of the rendered media content; and
- constructing the input feature based on the labelled first portion of the rendered media content, the determined emotional state information, and the extracted audio track.

19. The method according to claim 18, wherein the selected first content modification operation comprises one or more of:
- a first modification applicable on an audio playback of the first portion,
- a second modification applicable on a subtitle or a closed caption data in the first portion,
- a third modification applicable on a display of the first portion,
- a masking operation applicable on the determined ROI in the first portion of the rendered media content, or
- a blur operation applicable on the determined ROI in the first portion of the rendered media content.

20. A non-transitory computer-readable medium having stored thereon, computer-executable instructions that when executed by an electronic device, causes the electronic device to execute operations, the operations comprising:
- determining emotional state information associated with a wearer of each of a plurality of head-mounted display (HMD) devices, wherein
  - each HMD device of the plurality of HMD devices renders media content in a computer-simulated environment, and
  - the determined emotional state information corresponds to a first portion of the rendered media content;
- constructing an input feature for a first neural network based on the first portion of the rendered media content and the determined emotional state information;
- selecting, from a set of content modification operations associated with the rendered media content, a first content modification operation based on application of the first neural network on the constructed input feature; and
- modifying the rendered media content based on the selected first content modification operation, wherein the modified media content is rendered on at least one HMD device of the plurality of HMD devices.

* * * * *